US010083163B2

(12) United States Patent
Hickey et al.

(10) Patent No.: US 10,083,163 B2
(45) Date of Patent: Sep. 25, 2018

(54) COMPLETING FIELDS IN ELECTRONIC DOCUMENTS BY AUTOMATICALLY ASSIGNING DRAWING INPUT

(71) Applicant: Adobe Systems Incorporated, San Jose, CA (US)

(72) Inventors: Shannon Hickey, Newmarket (CA); Frederic Thevenet, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/233,453

(22) Filed: Aug. 10, 2016

(65) Prior Publication Data

US 2018/0046605 A1 Feb. 15, 2018

(51) Int. Cl.
*G06F 17/20* (2006.01)
*G06F 17/24* (2006.01)
*G06F 3/0488* (2013.01)

(52) U.S. Cl.
CPC ........ *G06F 17/243* (2013.01); *G06F 3/04883* (2013.01)

(58) Field of Classification Search
CPC ................................. G06F 3/04883
See application file for complete search history.

(56) References Cited

U.S. PATENT DOCUMENTS 5,455,901 A * 10/1995 Friend ................ G06K 9/00429
345/179
5,598,487 A 1/1997 Hacker
6,408,092 B1 6/2002 Sites
2005/0120296 A1 * 6/2005 Zeuli .................. G06F 19/363
715/277
2008/0235577 A1 9/2008 Veluchamy et al.
2010/0128291 A1 5/2010 Vendrow et al.
2010/0195910 A1 8/2010 Tsay et al.
2011/0060985 A1 3/2011 Kerr et al.
2012/0092374 A1 4/2012 Sarnoff
(Continued)

FOREIGN PATENT DOCUMENTS

JP 2014139764 7/2014

OTHER PUBLICATIONS

U.S. Appl. No. 14/698,220, dated Jun. 28, 2017, Preinterview Office Action.
(Continued)

*Primary Examiner* — Keith D Bloomquist
(74) *Attorney, Agent, or Firm* — Keller Jolley Preece

(57) ABSTRACT

The present disclosure includes methods and systems for completing fields in an electronic document utilizing drawing input. In particular, upon receiving drawing input in an electronic document with a plurality of fields, one or more embodiments of the disclosed systems and methods automatically identify an appropriate field corresponding to the drawing input. For instance, the disclosed systems and methods can assign drawing input to an appropriate field based on a number of drawing units located within the boundary of each field in the plurality of fields. Moreover, upon identifying the appropriate field corresponding to the drawing input, the disclosed systems and methods can automatically modify the drawing input to fit within a boundary of the identified field.

20 Claims, 29 Drawing Sheets

(56) References Cited

U.S. PATENT DOCUMENTS

| | | |
|---|---|---|
| 2012/0303962 A1 | 11/2012 | Ghani et al. |
| 2014/0019855 A1* | 1/2014 | Kim .................. G06Q 10/10 715/268 |
| 2015/0071505 A1 | 3/2015 | Kim et al. |
| 2015/0086114 A1 | 3/2015 | Todeschini |
| 2016/0012315 A1* | 1/2016 | Perrin ................ G06K 9/00409 382/161 |
| 2016/0042165 A1 | 2/2016 | Nicholson et al. |
| 2016/0179777 A1* | 6/2016 | Zhang ................ G06F 3/04883 715/268 |
| 2016/0180160 A1 | 6/2016 | VanBlon et al. |
| 2016/0321214 A1 | 11/2016 | Hickey |

OTHER PUBLICATIONS

U.S. Appl. No. 14/698,220, dated Nov. 16, 2017, First Action Office Action.
U.S. Appl. No. 14/698,220, dated May 3, 2018, Office Action.

* cited by examiner

COMPLETING FIELDS IN ELECTRONIC DOCUMENTS BY AUTOMATICALLY ASSIGNING DRAWING INPUT

BACKGROUND

Recent years have seen a rapid proliferation in the use of form electronic documents. For example, individuals and businesses increasingly utilize digital contracts, enrollment forms, agreements, and/or questionnaires that seek digital input of various types of information (e.g., address, birthdate, age, or other identifying information). Indeed, whether registering for an event, visiting a doctor's office, or applying for a job, it is becoming increasingly common for individuals to provide information by completing a form electronic document.

Some conventional digital form filling systems allow users to complete electronic documents by typing digital text into one or more fields. For example, conventional digital form filling systems can detect a user selection of a field and allow an individual to type into the field utilizing a computing device. Although such conventional digital form filling systems allow user input of information in electronic documents, they also have a number of shortcomings. For instance, conventional digital form filling systems are often slow and difficult for users to operate. To illustrate, users of touch devices must often tap on a field and use an on-screen keyboard to enter text input, repeating this process (tapping and using an on-screen keyboard) in relation to all fields in an electronic document. Accordingly, users often express frustration with the amount of time and the number of user interactions required to complete form electronic documents using such conventional digital form filling systems.

These and other problems exist with regard to completing fields in electronic documents.

BRIEF SUMMARY

One or more embodiments of the present disclosure provide benefits and/or solve one or more of the foregoing or other problems in the art with systems and methods that allow a user to quickly, accurately, and efficiently complete fields in an electronic document. For instance, the disclosed systems and methods allow users to enter drawing input on an electronic document and, in response, the disclosed systems and methods automatically provide the drawing input for display within a boundary of an appropriate field of the electronic document.

For example, in one or more embodiments, the disclosed systems and methods detect drawing input in relation to an electronic document comprising a plurality of fields, wherein each field of the plurality of fields comprises a boundary. Moreover, the disclosed systems and methods identify a field from the plurality of fields by comparing a location of the drawing input to the boundary of each field of the plurality of fields. In addition, the disclosed systems and methods modify the drawing input to generate a modified drawing and provide the modified drawing within a boundary corresponding to the identified field.

By detecting drawing input and automatically assigning the drawing input to an appropriate field, the disclosed systems and methods allow users to more easily and efficiently complete form electronic documents. Indeed, in one or more embodiments, users simply draw input on an electronic document (e.g., utilizing a touchscreen and/or a stylus) and the disclosed systems and methods automatically provide the input in the appropriate field. For instance, users do not have to manually select a field or utilize a keyboard or touchscreen keypad to enter digital text.

Moreover, by providing an interface area for receiving drawing input, the disclosed systems and methods can receive drawing input that extends beyond a boundary of a particular field. Accordingly, users are not limited to field boundaries in completing an electronic document (i.e., boundaries that may be too small to provide input utilizing typical input devices such as a touchscreen, mouse, or stylus). Rather, the disclosed systems and methods can receive drawing input in relation to any portion of an electronic document, determine a field corresponding to the drawing input, and then modify the drawing input to fit within the boundaries of the field within the electronic document.

In addition, in one or more embodiments, the disclosed systems and methods utilize a handwriting recognition algorithm to convert drawing input into digital text characters. Moreover, the disclosed systems and methods modify the digital text characters to fit within a boundary of an appropriate field. In this manner, one or more embodiments of the systems and methods complete fields with digital text characters based on drawing input by automatically assigning the drawing input to an appropriate field and converting the drawing input to digital text characters.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
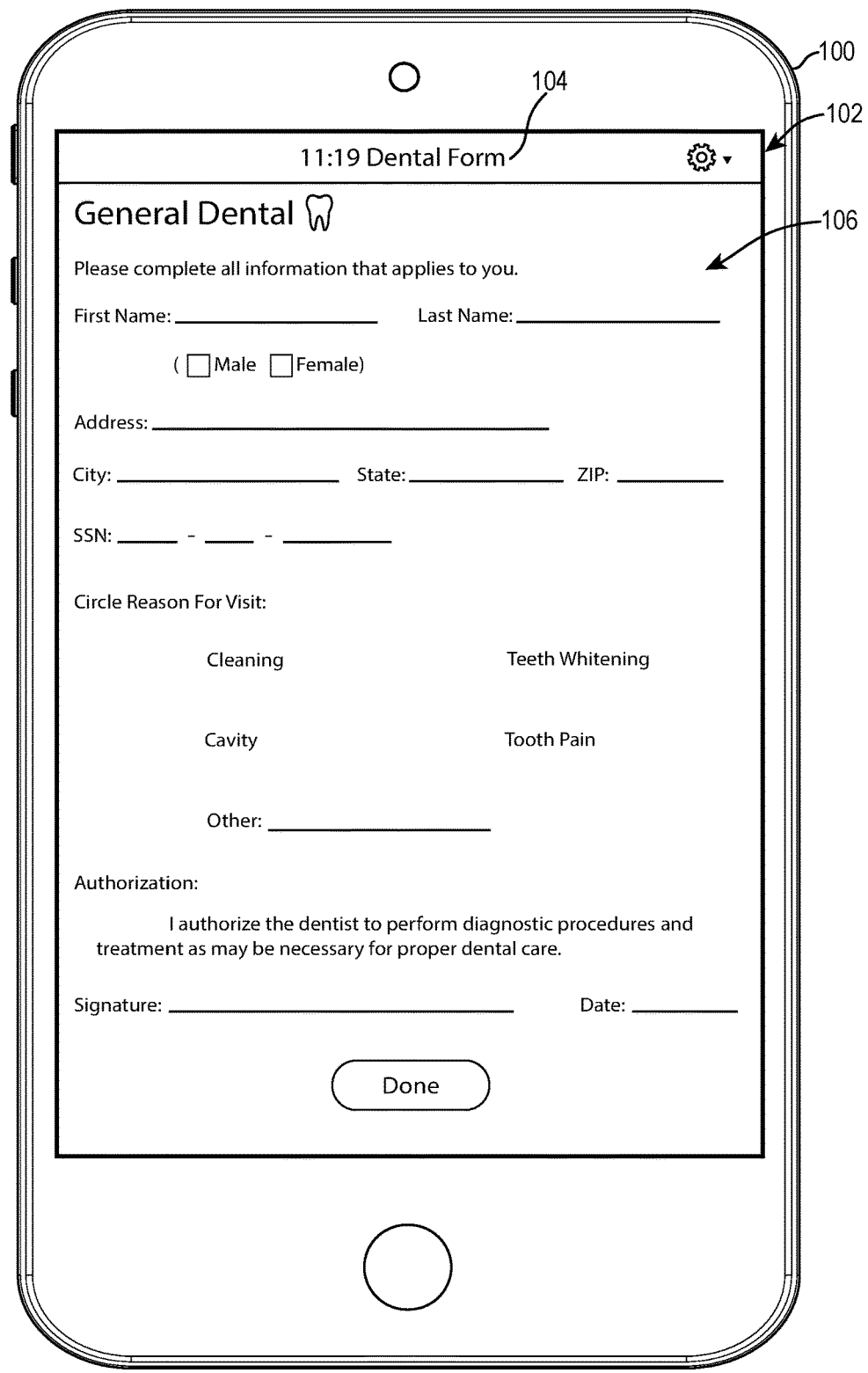
FIG. 1A illustrates a computing device displaying an electronic document in accordance with one or more embodiments.

One or more embodiments of the present disclosure include a digital form input system that quickly, accurately, and efficiently completes form fields (or simply "fields") in an electronic document. In particular, in one or more embodiments, the digital form input system can complete a variety of fields in an electronic document based on drawing input from a user. For instance, in one or more embodiments, a user provides drawing input (e.g., draws a name via a touchscreen), and the digital form input system automatically identifies a field corresponding to the drawing input. Moreover, the digital form input system can automatically modify the drawing input to fit within the identified field.

For example, in one or more embodiments, the digital form input system provides an interface area on an electronic document, wherein the electronic document comprises a plurality of fields, and each field of the plurality of fields comprises a boundary. In addition, the digital form input system receives, via the interface element, drawing input comprising a plurality of drawing units. Moreover, the digital form input system determines a number of drawing units of the drawing input located within the boundary corresponding to each field of the plurality of fields. Further, the digital form input system selects a field of the plurality of fields based on the number of drawing units located within a boundary corresponding to the selected field. Thereafter, the digital form input system modifies the drawing input based on the boundary corresponding to the selected field and provides the modified drawing in the electronic document within the boundary corresponding to the selected field.

As just mentioned, in one or more embodiments, the digital form input system utilizes an interface area to receive drawing input in relation to an electronic document. In particular, in one or more embodiments, the digital form input system provides a canvas that covers an electronic document to receive drawing input. By utilizing a canvas that covers (i.e., matches or exceeds all or a portion of) an electronic document, the digital form input system can receive drawing input that goes beyond field boundaries. Accordingly, even if users exceed the boundaries of a field in providing drawing input (or even provide drawing input that crosses multiple fields), the digital form input system can still receive the drawing input and assign the drawing input to an appropriate field. Indeed, in one or more embodiments, the digital form input system allows users to utilize an entire electronic document for providing drawing input.

Moreover, in one or more embodiments, the digital form input system identifies a field based on detecting that drawing input is complete, and accordingly, assigns the drawing input to a particular field. For example, in one or more embodiments, the digital form input system identifies a field corresponding to drawing input based on an amount of drawing input located within field boundaries. In particular, the digital form input system can monitor drawing units and determine a number of drawing units that are located within field boundaries of an electronic document.

Moreover, the digital form input system can compare the number of drawing units corresponding to individual fields. Thus, for instance, the digital form input system can compare the number of drawing units located within a first field to the number of drawing units located within a second field. Based on the comparison (e.g., based on a determination that the first field has a greater number of drawing units), the digital form input system can identify a field corresponding to the drawing input (e.g., that the drawing input corresponds to the first field).

In addition to comparing the number of drawing units falling within field boundaries, the digital form input system can select a field corresponding to drawing input based on a variety of additional factors. For example, the digital form input system can determine fields that already contain digital content, fields that are located within a vertical and/or horizontal threshold distance of other fields, or a sequential order of fields that receive drawing input. As such, the digital form input system can identify a field corresponding to drawing input based on whether fields already contain digital content, whether fields are located within the vertical and/or horizontal threshold distance, and/or the sequential order that particular fields receive drawing input.

In addition to identifying a field corresponding to drawing input, the digital form input system can also modify drawing input. In particular, the digital form input system can modify drawing input to generate a modified drawing that fits within a field boundary. To illustrate, the digital form input system can resize drawing input based on dimensions of a field boundary and translate the drawing input to a new position within the field boundary. Accordingly, the digital form input system can provide a modified drawing for display within a field boundary, even if the user provides drawing input outside the field boundary.

The digital form input system can also modify drawing input by converting drawing input to digital text characters. For example, in one or more embodiments, the digital form input system utilizes a handwriting recognition algorithm to transform drawing input into digital text characters. The digital form input system can then modify the digital text characters (e.g., fonts size, spacing, or font type) to fit within field boundaries.

Furthermore, the digital form input system can operate in conjunction with any type or variety of field. For instance, the digital form input system can operate in conjunction with text fields, check box fields, and/or fields with a plurality of sub-sections (e.g., comb fields). For example, the digital form input system can modify drawing input to fit within check box fields or generate a digital text character to provide for display within a check box field. Similarly, the digital form input system can group drawing input and provide the grouped drawing input in sub-sections of fields.

In addition, in one or more embodiments, the digital form input system also provides drawing input for display outside of field boundaries. For instance, in one or more embodiments, the digital form input system determines that drawing input does not correspond to any fields of an electronic document. In response, the digital form input system can provide the drawing input for display as received. In this manner, the digital form input system can allow users to both draw on an electronic document (e.g., create notes or circle selections) and complete fields within the electronic document.

The digital form input system can also determine a type of field and select particular modifications to drawing input based on the type of field. For example, the digital form input system can determine that a first field corresponds to an address and a second field corresponds to a signature. The digital form input system can convert drawing input corresponding to the first field to digital text characters (e.g., to make the address easier to read) while modifying drawing input corresponding to the second field to fit within the signature field (e.g., and retain the appearance of a signature).

Advantageously, the digital form input system allows users to quickly and easily complete fields in an electronic document. Indeed, users can quickly draw input on an electronic document and the digital form input system automatically identifies a corresponding field and modifies the drawing input to fit within the field. Furthermore, by receiving and modifying drawing input outside of field boundaries, the digital form input system can provide flexibility to users in completing fields in electronic documents.

Moreover, because one or more embodiments of the digital form input system automatically modifies drawing input to fit within field boundaries, the digital form input system allows users to provide more accurate and precise input in relation to fields of an electronic document. Indeed, the relatively small size of many field boundaries in electronic documents makes it difficult for users to provide accurate or precise input utilizing conventional user input devices. Similarly, many users may lack the capability to provide accurate or precise input in a small space as a result of inexperience, disability, or unfamiliarity. The digital form input system provides an elegant solution to these concerns by allowing users to provide drawing input outside of field boundaries, automatically identifying a corresponding field, and then providing modified drawing input within field boundaries.

Furthermore, by converting drawing input to digital text characters, in one or more embodiments, the digital form input system also allows users to obtain the clarity of typing digital text, without the added inconvenience of selecting fields and utilizing digital keyboards. Indeed, users can simply draw on an electronic document (e.g., via a touch screen, mouse, and/or stylus) and the digital form input system can detect a field corresponding to the drawing input, convert the drawing input to digital text characters, and fill the corresponding field with the digital text characters.

In addition, the digital form input system also improves interaction and communication amongst computing devices and corresponding input devices. Indeed, the digital form input system allows computing devices to complete electronic documents with fewer user interactions with input devices. Further, the digital form input system improves the functioning of computing devices by transforming the computing device into a tool that automatically identifies and completes form fields in electronic documents.

Additional detail will now be provided regarding the digital form input system in relation to illustrative figures portraying exemplary embodiments. In particular, in relation to FIGS. 1A-1G disclosure is provided regarding receiving, assigning, and providing drawing input for display in relation to a field of an electronic document in accordance with one or more embodiments. Thereafter, with regard to FIGS. 2A-2C, additional disclosure is provided regarding receiving, assigning, and providing drawing input in relation to a check box field in accordance with one or more embodiments.

In addition, FIGS. 3A-4D provide additional detail regarding assigning drawing input to a field of a plurality of fields of an electronic document in accordance with one or more embodiments. Furthermore, in relation to FIGS. 5A-5E, additional disclosure is provided regarding modifying drawing input in relation to fields with a plurality of sub-sections (including comb fields). Moreover, FIGS. 6, 7A-7B, and 8A-8B illustrate providing drawing input that is not located within a field, selecting a modification to drawing input based on a field type, and providing an autocomplete suggestion in accordance with one or more embodiments.

As just mentioned, FIGS. 1A-1G illustrate receiving, assigning, and providing drawing input for display in relation to a field of an electronic document. Specifically, FIG. 1A illustrates a computing device 100 (e.g., a tablet device), with a touchscreen 102 portraying a user interface 104. Moreover, the user interface 104 comprises an electronic document 106 (e.g., a PDF document). The electronic document 106 contains characters prompting a user of the computing device 100 to provide personal information (e.g., information in relation to the provision of dental services).

As used herein, the term "electronic document" refers to any form of electronic content, regardless of form. For example, an electronic document can include electronic files in the form of a word processing document, a PDF file, an image file, an e-mail file, a text file, a web page, or any other electronic file. Accordingly, although the electronic document 106 comprises a PDF document, it will be appreciated that the digital form input system can operate in conjunction with a variety of other electronic documents, such as a web page. In one or more embodiments, the digital form input system can identify, detect, and/or generate one or more fields in an electronic document. In particular, the digital form input system can identify one or more fields and one or more boundaries corresponding to each field in an electronic document.

As used herein, the term "field" (or "form field") refers to a geometrically contained section of an electronic document. In particular, the term "field" includes a component that is geometrically constrained (e.g., constrained by size and/or shape) by a boundary. An example of a field is a signature box within an electronic document that can include a representation of a signature within a boundary that defines the signature box. Similarly, a field can comprise a boundary that can include digital text characters. Moreover, a field can include a comb field, a check box field, or a digital image field. In addition, a field can comprise a plurality of subsections. A field can receive and/or include a variety of types of input. For example, a field can receive and/or include drawing input, digital text characters, and/or digital images.

As used herein, the term "boundary" refers to limits of an area. In particular, a boundary of a field refers to the limits of a field. For example, a boundary of a field can comprise a digital item that describes a line, polygon, box, circle, or other geometric shape that defines the limits of the field. For example, a boundary of a field can comprise a digital item that defines the geometric limits of what the field can receive, display, detect, and/or generate. A boundary need not be visible within an electronic document. For example, a field can have boundaries that are not provided for display within the electronic document. Alternatively, a field can have boundaries that are explicitly defined and provided for display in an electronic document by text, lines, drawings, or some other indication.

Figure 1B:
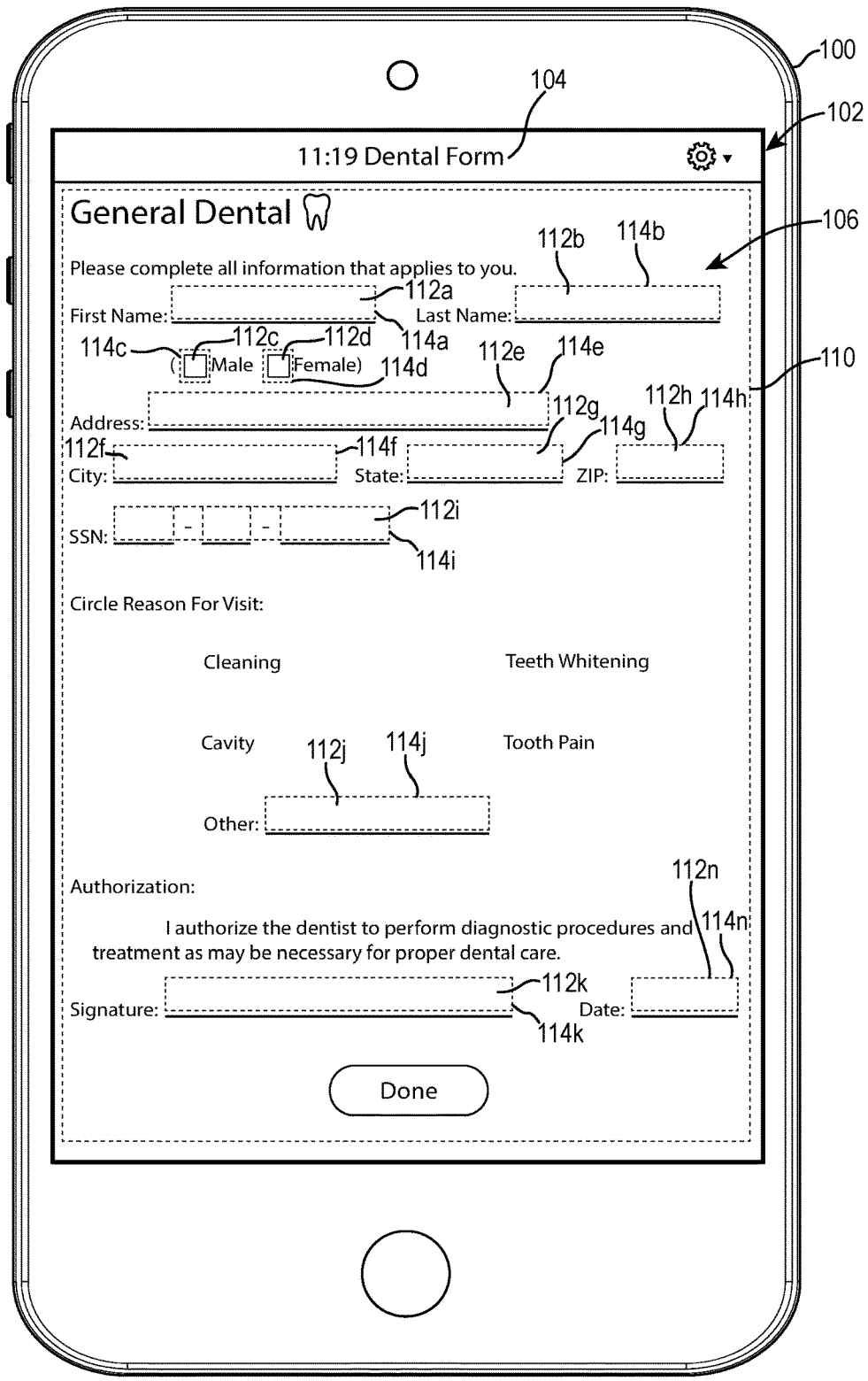
FIG. 1B illustrates the electronic document of FIG. 1A with a plurality of fields and an interface area for receiving drawing input in accordance with one or more embodiments.

For example, as illustrated in FIG. 1B, the digital form input system identifies fields 112a-112n in the electronic document 106. In particular, the digital form input system identifies fields 112a-112n and corresponding boundaries 114a-114n. Each of the fields 112a-112n can include digital text characters, digital images, and/or drawing input within the corresponding boundaries 114a-114n.

As mentioned previously, in one or more embodiments, the digital form input system generates the fields 112a-112n. For example, in one or more embodiments, the digital form input system can detect baselines corresponding to each of the fields 112a-112n and generate the fields 112a-112n based on the detected base lines. To illustrate, the field 112k has a base line for a signature. The digital form input system can detect the base line and generate a signature field based on the base line (e.g., a rectangle with a width of the base line and a height based on open space above the baseline).

Alternatively, or in addition to the examples above, the digital form input system generates the fields 112a-112n based on user input. For example, in one or more embodiments, a creator of the electronic document 106 can provide user input to define the fields 112a-112n (e.g., draw rectangles corresponding to each field). Furthermore, in one or more embodiments, the digital form input system can identify pre-existing fields. For example, in one or more embodiments, the digital form input system accesses an electronic document and identifies fields that were previously defined by another user, party, or system.

As mentioned previously, in one or more embodiments, the digital form input system can also generate an interface area. In particular, the digital form input system can generate an interface area for receiving drawing input. As used herein, the term "interface area" refers to an area of an electronic document used to capture user input (e.g., drawing input). The specific type of interface area can vary from one embodiment to the next depending on, for example, programming language, type of application, software characteristics, operating environment, or other factors. In general, an interface area provides a drawing input capture area that is larger than a field of an electronic document. For example, an interface area can include, but is not limited to, a canvas, a drawing overlay, a drawing underlay, or any other user interface component capable of capturing user input (e.g., drawing input).

As used herein, the term "drawing input" refers to user input based on movement in relation to an input device. For instance, "drawing input" includes user input based on movement of a finger (e.g., on a touchpad or via a digital glove), a stylus, or a mouse to draw or otherwise provide input on an electronic document. To illustrate, drawing input includes data generated by a user scribbling a word with a finger on a touchpad device. Drawing input can include data generated by a variety of user interactions, including mouse press, mouse drag, mouse scroll, and mouse release events; stylus press, stylus drag, and stylus release events; and/or touchscreen press, touchscreen drag, touchscreen pinch, and touchscreen release events.

Moreover, as used herein, the term "user interaction," refers to conduct (or a lack of conduct) performed by a user to control the function of a computing device. For example, a user interaction can include pressing, dragging, scrolling, or releasing a mouse; pressing, dragging, pinching, or releasing a touchscreen or touchpad; or any other conduct performed by a user in the course of interacting with a computing device. In many cases a user interaction can be associated with any number of graphical user interface elements or other components displayed by way of a display screen (e.g., using an input device to select a graphical user interface element).

The term "user input," as used herein, refers to input data generated in response to a user interaction. In particular, user input can be generated based on a user interaction with an input device. For example, user input can be generated in response to one or more user interactions (in combination or in isolation) directed toward one or more interface areas. User input includes drawing input, as described above.

As mentioned previously, the digital form input system can generate one or more interface areas for receiving drawing input. For example, in relation FIG. 1B the digital form input system generates an interface area 110. In particular, with regard to the embodiment of FIG. 1B, the digital form input system generates the interface area 110 (e.g., as a canvas covering the electronic document 106). In some embodiments, the digital form input system generates the interface area 110 to correspond with the size of the touch screen 102 (e.g., approximately the size or the same size as the touch screen 102). In this way, in the event that an electronic document does not fill the entire area of the touch screen 102, the digital form input system can generate the interface area 110 to allow a user to interact with all (or approximately all) of the touch screen 102 to provide drawing input.

It will be appreciated that although FIG. 1B illustrates the interface area 110 as a rectangular canvas covering the entire electronic document 106, the digital form input system can generate one or more interface areas of different sizes and/or shapes. For example, rather than covering the entire electronic document 106, the digital form input system can generate the interface area 110 to cover a smaller portion of the electronic document 106 (e.g., to cover a subset of the fields 112a-112n, all of the fields 112a-112n, an area based on the size of the fields 112a-112n, or some other area). Similarly, the digital form input system can generate an interface area that is a circle, a polygon, or some other shape.

Furthermore, in one or more embodiments, the digital form input system generates more than one interface area. For example, the digital form input system can generate multiple interface areas based on the location of one or more fields in an electronic document. To illustrate, the digital form input system can generate a first interface area that covers the fields 112a-112i, a second interface area that covers the field 112j, and a third interface area that covers the fields 112k and 112n.

Figure 1C:
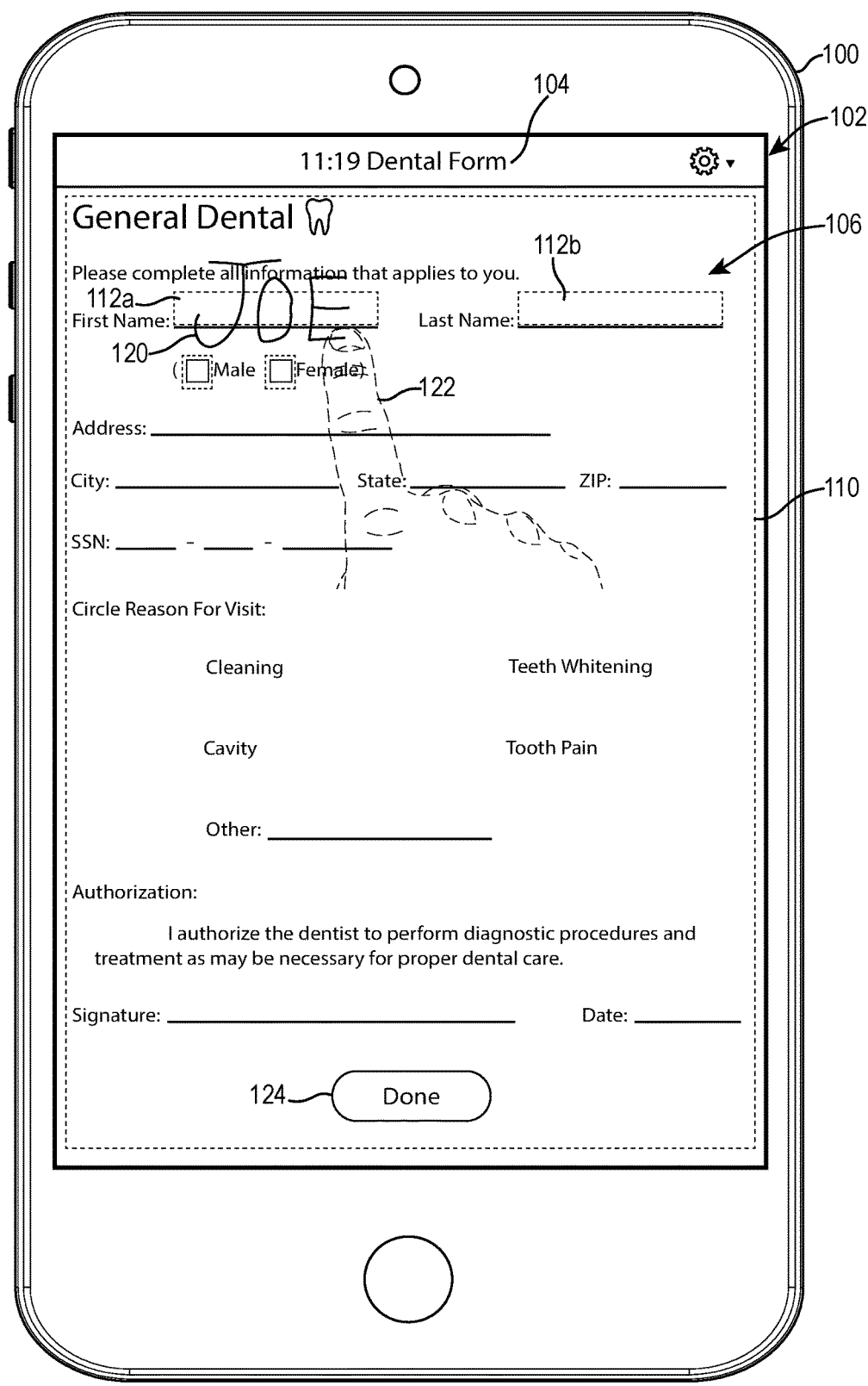
FIG. 1C illustrates the electronic document of FIG. 1B upon receiving drawing input in accordance with one or more embodiments.

As mentioned above, however, in one or more embodiments, the digital form input system receives drawing input via an interface area. For example, as illustrated in FIG. 1C, the digital form input system receives, via the interface area 110, drawing input 120. Specifically, the interface area 110 receives the drawing input 120 (i.e., "JOE"), based on a finger 122 pressing, dragging along, and releasing the touchscreen 102 to form each of the characters J-O-E.

As illustrated in FIG. 1C, in one or more embodiments, the digital form input system provides drawing input for display. In particular, the digital form input system provides the drawing input 120 for display (utilizing the interface area 110) in response to receiving the drawing input 120 via the interface area 110. In this manner, the digital form input system can provide feedback to the user regarding the appearance of the drawing input 120 as it is received so that the user can more easily and accurately complete the drawing input.

Furthermore, although the interface area 110 and the fields 112a-112n are represented in FIG. 1C as dashed lines, it will be appreciated that the digital form input system can provide different visual representations of the interface area 110 and the fields 112a-112n (or no visual representations of the interface area 110 and the fields 112a-112n). For example, in one or more embodiments, the digital form input system provides the interface area 110 for display as a solid boundary line. Similarly, in one or more embodiments, digital form input system provides the interface area 110 for display, as an opaque (semi-translucent) area. Moreover, in one or more embodiments, the digital form input system provides a visual representation for display that is smaller than the interface area 110 (e.g., larger than one or more field boundaries, but smaller than the entire electronic document 106). In this manner, the digital form input system can indicate to a user that the interface area 110 is available to receive drawing input beyond field boundaries.

Similarly, the digital form input system can provide a variety of visual representations of the fields 112a-112n. For example, in addition to dashed lines (as shown in FIG. 1B), the digital form input system can provide for display solid lines of the boundaries 114a-114n. Similarly, in one or more embodiments, the digital form input system can provide for display opaque (semi-translucent) areas within the boundaries 114a-114n. Indeed, by providing visual representations of the fields 112a-112n (and/or the interface area 110) the digital form input system can indicate to a user a target area for providing drawing input together with an indication that users can go beyond field boundaries in providing drawing input.

Alternatively, the digital form input system can make the fields 112a-112n and/or the interface area 110 implicit (e.g., provide no visual representation of the form fields 112a-112n and/or the interface area 110). In this manner, the digital form input system can provide a clean user interface while still receiving drawing input beyond field boundaries.

As mentioned above, the digital form input system can also determine when a user has completed providing drawing input. For example, in relation to FIG. 1C, the digital form input system determines that a user has completed providing drawing input based on a threshold period of time. Specifically, the digital form input system determines whether a threshold period of time has passed without receiving any additional drawing input. Upon expiration of the threshold period of time, the digital form input system determines that the drawing input is complete.

In this manner, the digital form input system can receive drawing input that comprises multiple release events and/or gaps in drawing input. For example, in drawing the word "JOE," illustrated in FIG. 1C, the finger 122 presses and drags on the touchscreen 102 to complete the letter "J", releases the finger 122 from the touchscreen 102, and presses the touchscreen 102 again to begin the letter "O". Accordingly, there is a period of time (e.g., a gap) in drawing input after completion of the letter "J" and before beginning the letter "O." However, because the threshold period of time does not lapse between the end of the letter "J" and the beginning of the letter "O," the digital form input system determines that the drawing input 120 is not complete. Upon completion of the letter "E" the digital form input system detects expiration of the threshold period of time without receiving additional user input and determines that the drawing input 120 is complete.

In addition to utilizing a threshold period of time, it will be appreciated that the digital form input system can determine that drawing input is complete by utilizing a variety of additional methods. For example, the digital form input system can determine that a user has completed providing drawing input based on a variety of gestures (e.g., a double-tap). Similarly, rather than waiting a threshold period of time, the digital form input system can determine a user has completed providing drawing input based on user interaction with another user interface element. For example, the digital form input system can detect user input with a selectable element via the user interface 104 (e.g., the "Done" selectable element 124), and based on the selection of the selectable element, determine that the drawing input 120 is complete.

As discussed above, the digital form input system can also identify a field corresponding to drawing input. In particular, in one or more embodiments, the digital form input system identifies a corresponding field and modifies the drawing input to fit within the corresponding field boundaries. For example, FIG. 1D illustrates identifying a field corresponding to drawing input and FIG. 1E illustrates modifying drawing input in accordance with one or more embodiments.

Figure 1D:
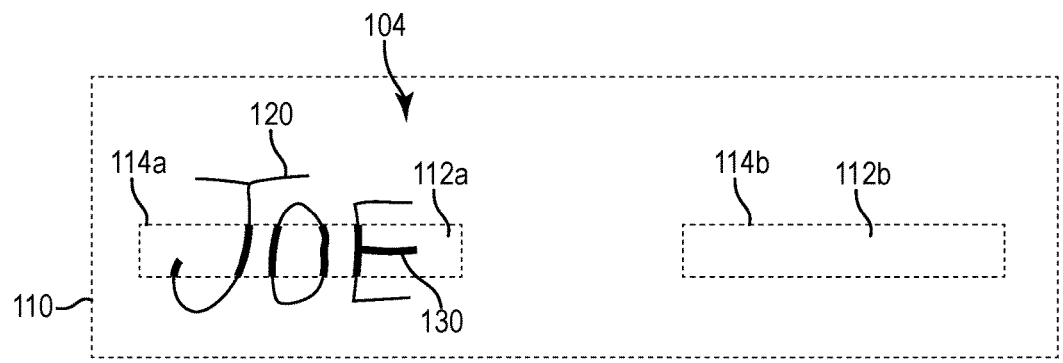
FIG. 1D illustrates a representation of identifying a field corresponding to drawing input in accordance with one or more embodiments.
Figure 1E:
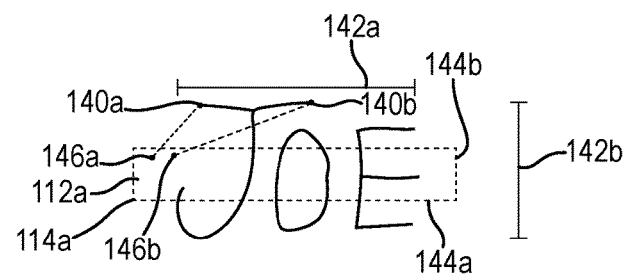
FIG. 1E illustrates modifying drawing input based on a boundary of a corresponding field in accordance with one or more embodiments.

Specifically, FIG. 1D illustrates the drawing input 120 and the fields 112a, 112b. In particular, the digital form input system determines that the drawing input 120 corresponds to the field 112a by detecting amounts of the drawing input 120 located within the fields 112a-112n. Specifically, as shown in FIG. 1D, the digital form input system identifies an amount 130 (represented as the bolded portions of each character) of the drawing input 120 that is located within the boundary 114a of the field 112a. Based on the determination that the amount 130 is the only portion of the drawing input 120 located within the boundaries 114a-114n of the fields 112a-112n, the digital form input system can determine that the drawing input 120 corresponds to the field 112a.

In one or more embodiments, the digital form input system determines the amount 130 of the drawing input 120 that falls within the boundary 114a of the field 112a by measuring drawing units corresponding to the drawing input 120. For example, upon receiving all or a portion of the drawing input 120, the digital form input system (e.g., via the interface area 110 and/or the fields 112a-112n) can count drawing units of the drawing input 120. Specifically, the digital form input system can count the number of drawing units that are located within boundaries 114a-114n of the fields 112a-112n.

As used herein, the term "drawing unit" refers to portions of drawing input. In particular, the term "drawing unit" refers to digital items measured by a computing device to define portions of drawing input. For example, "drawing unit" can include pixels, data points, positions, events, areas, and/or locations utilized by a computing device to measure portions of drawing input. For instance, the term "drawing unit" can include touch events (e.g., press, release, or drag events) measured by a touchscreen of a computing device. Similarly, the term "drawing unit" can include a measure of an input region defining an area of drawing input (e.g., units of area defining a region encompassed by drawing input). To further illustrate, in one or more embodiments, the digital form input system can measure drawing units of the drawing input 120 by measuring the number of pixels of the drawing input 120 or the number of data points corresponding to the drawing input 120. Similarly, the digital form input system can measure the number of drawing units of the drawing input 120 that fall within the boundary 114a of the field 112a by measuring the pixels or data points of the drawing input 120 that are located within the boundary 114a.

More specifically, in one or more embodiments, the digital form input system determines a number of drawing units of drawing input located within a particular boundary based on the co-ordinates of the drawing units. For instance, in one or more embodiments, the interface area 110 collects the drawing input 120 and determines the coordinates of each drawing unit corresponding to the drawing input 120 (e.g., coordinates in relation to the user interface 104, the interface area 110, the touch screen 102, or some other element or component). Moreover, the interface area 110 also determines the coordinates of the fields 112a-122n and corresponding boundaries 114a-114n. The interface area 110 then compares the coordinates of the drawing input 120 to the coordinates of the fields 112a-112n and determines the amount of the drawing input 120 located within the fields 112a-112n based on the comparison.

Although just described in terms of the interface area 110, it will be appreciated that in one or more embodiment the digital form input system utilizes the fields 112a-112n to determine an amount of drawing input falling within each field. For example, in one or more embodiments, the fields 112a-112n identify coordinates of drawing units of the drawing input 120. Moreover, the fields 112a-122n compare the coordinates of the drawing input 120 to the coordinates of the corresponding field boundaries 114a-114n. Thus, in one or more embodiments, each of the fields 112a-112n determine an amount of the drawing input 120 located within its own boundary. Moreover, based on the number of drawing units within each field, the digital form input system can determine a field corresponding to the drawing input 120.

In addition to determining a corresponding field based on an amount of drawing input within a particular boundary, the digital form input system can also determine a corresponding field based on other factors. For example, in one or more embodiments, the digital form input system can determine a corresponding field based on a distance between a field and drawing input.

To illustrate, in one or more embodiments, the digital form input system can determine that the drawing input 120 corresponds to the field 112a based on a distance between the drawing input 120 and the field 112a. Specifically, the digital form input system can calculate a distance between the field 112a (e.g., the center of the field 112a, the boundary 114a of the field 112a, or some other position corresponding to the field 112a) and drawing units of the drawing input 120 (e.g., calculate the sum of the distances between the field 112a and all drawing units in the drawing input 120). The digital form input system can also calculate a distance between the field 112b (e.g., the center of the field 112b, the boundary 114b of the field 112b, or some other position corresponding to the field 112b) and drawing units of the drawing input 120 (e.g., calculate the sum of the distances between the field 112b and all drawing unit in the drawing input 120). The digital form input system can then compare the distance between the field 112a and the drawing input 120 (e.g., the total distance between the field 112a and every drawing unit in the drawing input 120) to the distance between the field 112b and the drawing input 120 (e.g., the total distance between the field 112b and every drawing unit in the drawing input 120). The digital form input system can determine a corresponding field based on this comparison (e.g., the field with the smallest distance corresponds to the drawing input).

As mentioned previously, in one or more embodiments, the digital form input system also modifies drawing input. For instance, in one or more embodiments, the digital form input system receives drawing input utilizing an interface area, identifies fields corresponding to drawing input, and then modifies the drawing input received by the interface area based on the corresponding field. In particular, the digital form input system can modify drawing input to fit within a boundary of a field. For example, the digital form input system can resize (e.g., scale or shrink), translate, rotate, and otherwise modify drawing input based on a field.

To illustrate, the digital form input system can detect a width and a height of drawing input received via an interface area, detect a width and a height of a boundary of a field, and modify the drawing input based on the detected width and height of the drawing input and the detected width and height of the boundary. Specifically, the digital form input system can compare the width and height of the drawing input and the width and height of the boundary and scale the drawing input such that the drawing input fits within the boundary.

Moreover, the digital form input system can translate drawing input in relation to a field boundary. For example, the digital form input system can translate drawing input to be centered, left justified, right justified, or otherwise oriented within a field.

For example, FIG. 1E illustrates modifying the drawing input 120 to fit within the boundary 114a of the field 112a. Specifically, FIG. 1E illustrates the drawing input 120 (comprising points 140a and 140b), a drawing input width 142*a*, a drawing input height 142*b*, a boundary width 144*a*, and a boundary height 144*b*. The digital form input system compares the drawing input width 142*a* and the drawing input height 142*b* to the boundary width 144*a* and the boundary height 144*b*. The digital form input system then scales the drawing input 120 based on the comparison.

Specifically, in relation to FIG. 1E, the digital form input system determines a width ratio (i.e., a ratio of the boundary width 144*a* and the drawing input width 142*a*). Moreover, the digital form input system determines a height ratio (i.e. a ratio of the boundary height 144*b* and the drawing input height 142*b*). The digital form input system can then select the smallest ratio and scale the drawing input 120 based on the selected ratio.

For example, in relation to FIG. 1E, the digital form input system determines that the width ratio is approximately 1.25. Moreover, the digital form input system determines that the height ratio is approximately 0.3. Accordingly, the digital form input system selects the height ratio (i.e., the smallest ratio) and scales the drawing input 120 by a factor of 0.3 (so that the drawing input 120 will be modified to fit within the boundary 114*a*).

The digital form input system also translates the drawing input 120 to fit within the boundary 114*a*. Specifically, in one or more embodiments, the digital form input system adjusts each point to be left justified (and vertically centered) within the boundary 114*a*. Accordingly, as illustrated in FIG. 1E, the digital form input system scales the first point 140*a* by a factor of 0.3 (e.g., based on a coordinate system corresponding to the field or some other coordinate system) and moves the first point 140*a* so that it is left-justified within the boundary 114*a*, creating the modified point 140*b*. Similarly, the digital form input system scales the second point 140*b* by 0.3 and applies a corresponding translation to the second point 140*b*. In this manner, the digital form input system modifies the drawing input 120 to generate a modified drawing that fits within the boundary 114*a*.

Although the previous example describes left-justification of the drawing input 120, it will be appreciated that the digital form input system can arrange drawing input in a variety of ways within a field boundary. For example, rather than left-justified, the digital form input system can align drawing input such that it is centered, right justified, or otherwise oriented within the field boundary. Indeed, in one or more embodiments, the digital form input system selects a formatting in relation to drawing input. For example, the digital form input system can select an arrangement, location, font, size, or other formatting in relation to drawing input corresponding to particular fields. For example, in one or more embodiments, the digital form input system can store and/or access formatting information regarding alignment of drawing input in relation to properties of a field. Accordingly, upon receiving drawing input, the digital form input system can access field properties and apply a particular format (e.g., left-justified, bold, etc.) based on the field properties.

In one or more embodiments, the digital form input system utilizes multiple coordinate systems to generate a modified drawing. For example, in one or more embodiments, the digital form input system captures the first point 140*a* via the interface area 110 based on coordinates corresponding to the interface area 110 (e.g., coordinates measured from (0,0) at the top left of the interface area 110). Thereafter, the digital form input system can convert the first point 140*a* to coordinates corresponding to the field 112*a* (e.g., coordinates measured from (0,0) at the top left of the field 112*a*). Accordingly, the digital form input system can generate a modified drawing utilizing a variety of coordinate systems (e.g., scale drawing input utilizing the coordinate system of the interface area 110, convert to the coordinate system of the field 112*a*, and translate based on the coordinate system of the field 112*a*).

Figure 1F:
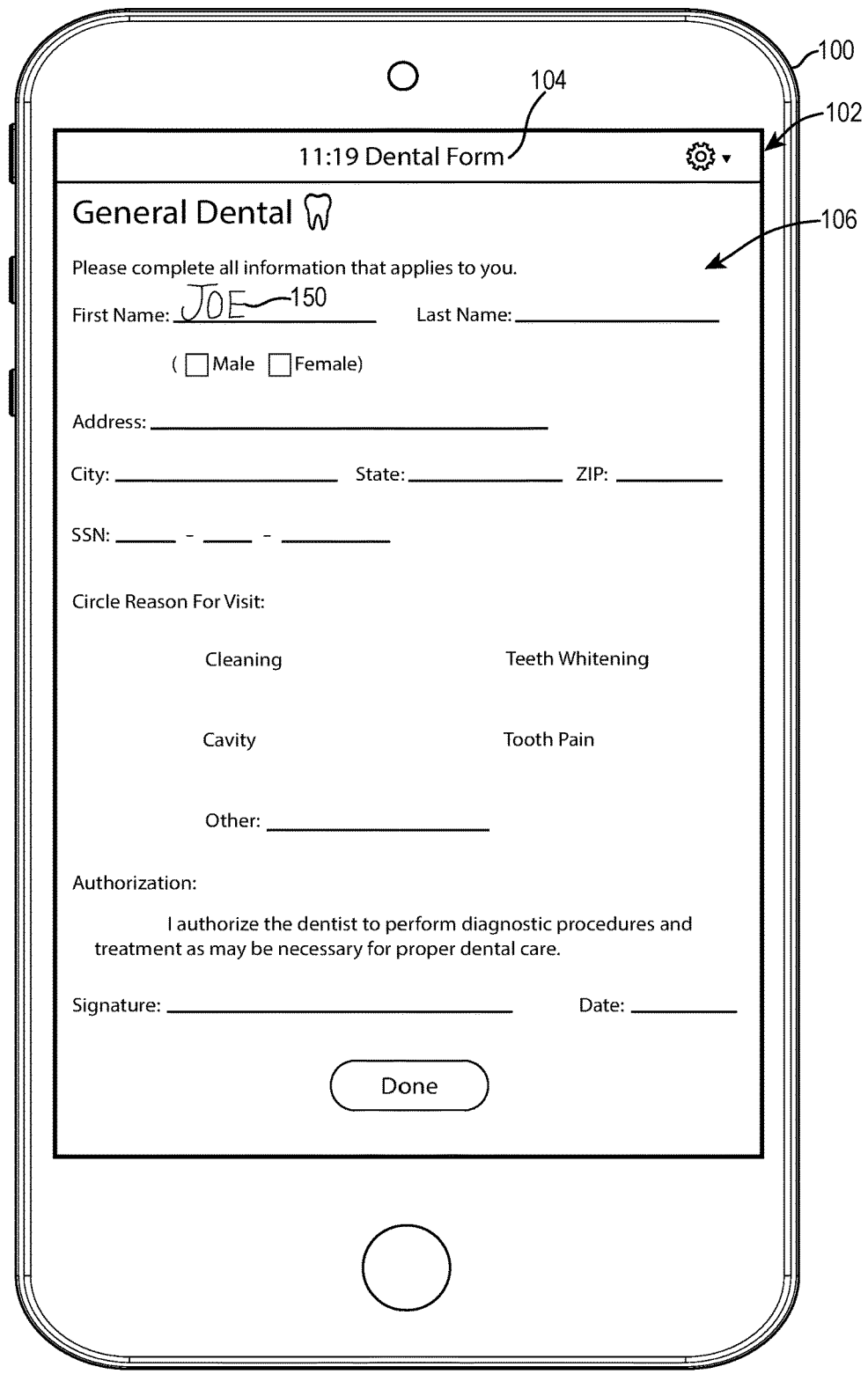
FIG. 1F illustrates the electronic document of FIG. 1A with the modified drawing input of FIG. 1E within the boundary of the corresponding field identified in FIG. 1D in accordance with one or more embodiments.

Upon generating a modified drawing, in one or more embodiments, the digital form input system provides the modified drawing for display. For example, FIG. 1F illustrates the electronic document 106 with a modified drawing 150 that comprises the drawing input 120 as modified to fit within the boundary 114*a*.

Notably, from the perspective of a user of the computing device 100, simply by drawing on the touchscreen 102 (outside the bounds of the field 112*a* utilizing the interface area 110), the digital form input system automatically receives the drawing input 120, identifies the field 112*a* corresponding to the drawing input 120, and modifies the drawing input 120 to fit within the field 112*a*. Accordingly, the combination of using the input interface 110 to receive drawing input 120, identifying a field corresponding to the drawing input 120, and modifying the drawing input 120 provides an intuitive user experience that increases an input area on the touchscreen 102 to easily allow a user to provide accurate drawing input and then positioning the drawing input within the corresponding field boundary to quickly and efficiently obtain a field having clean, clear, and precise drawing input.

As mentioned previously, in one or more embodiments, the digital form input system can also modify drawing input by converting the drawing input to digital text characters. In particular, the digital form input system can apply a handwriting recognition algorithm to convert drawing input to digital text characters. Moreover, the digital form input system can modify and provide the digital text characters for display within a field boundary. As used herein, the term "digital text character" refers to a standardized digital symbol. For instance, the term "digital text character" includes digital letters, digital numbers, digital punctuation, and other digital symbols from a standardized system or font. In particular, digital text characters include characters defined by the Unicode standard system, ASCII, and/or UTF-8.

Figure 1G:
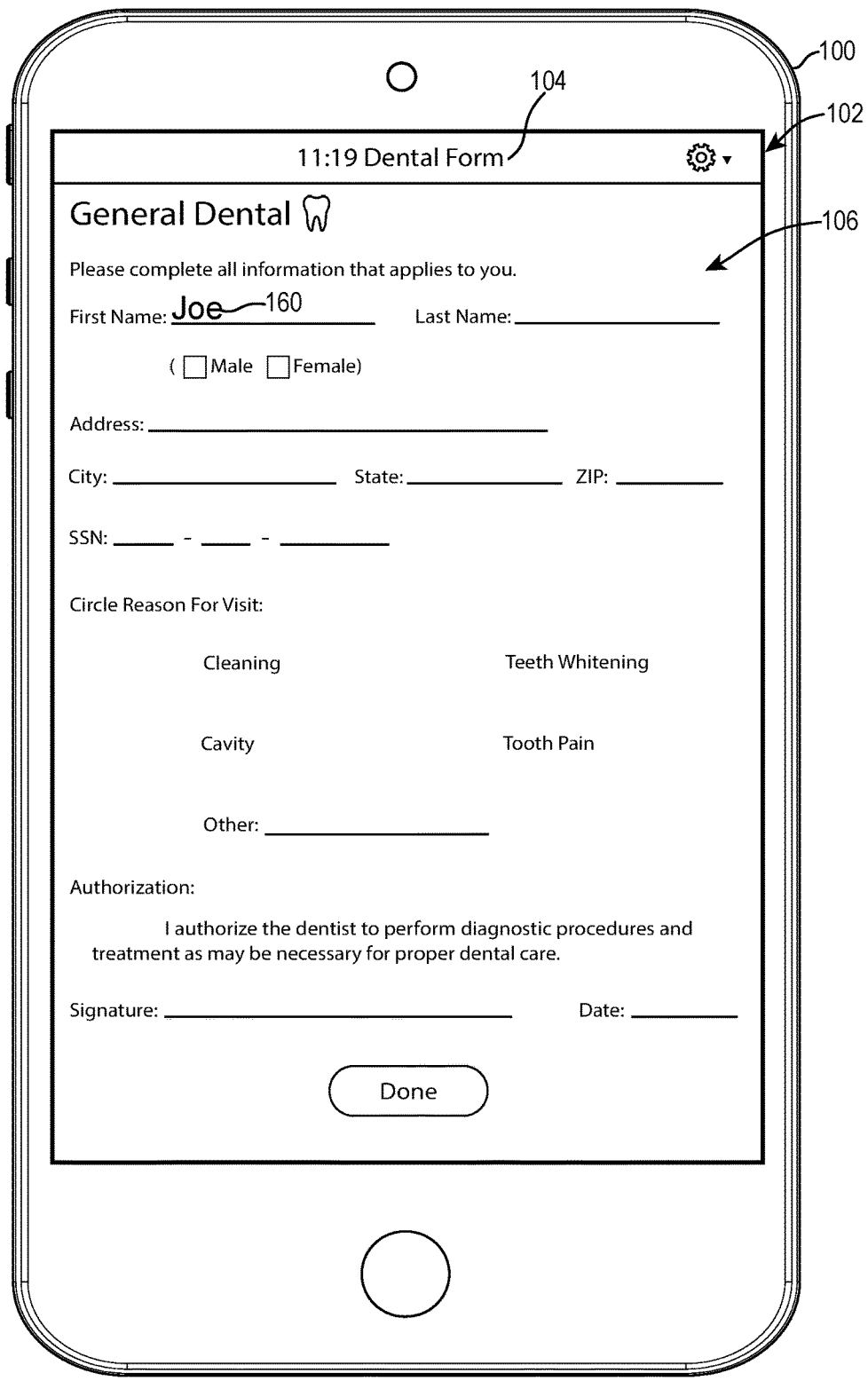
FIG. 1G illustrates converting drawing input into digital text and providing the digital text within the boundary of the corresponding field identified in FIG. 1D.

For example, FIG. 1G illustrates the electronic document 106 provided for display by the computing device 100 via the touchscreen 102 and the user interface 104. The electronic document 106 includes a modified drawing 160 that comprises the drawing input 120 upon conversion to digital text characters and further modification to fit within the boundary 114*a*. Specifically, the digital form input system in relation to the drawing input 120 (e.g., shown in FIG. 1C) applies a handwriting recognition algorithm to identify digital text characters. In particular, the digital form input system utilizes optical character recognition techniques to identify digital text characters from drawing input. For instance, the digital form input system extracts characters and/or words from drawing input, recognizes the characters and/or words (e.g., utilizing feature extraction and classification techniques), and then generates digital text characters to match the recognized characters and/or words.

Furthermore, the digital form input system can also utilize intelligent character recognition, and/or intelligent word recognition techniques to identify, segment, format and provide digital text characters from drawing input. In particular, the digital form input system can extract characters and/or words from drawing input, recognize the characters and/or words (e.g., via machine learning techniques, such as a neural network), and then generate digital text characters to match the recognized characters and/or words. Using one or more of the above techniques, the digital form input system can identify a variety of digital text characters. For example, the digital form input system can identify letters, numbers, and/or symbols. Thus, in relation to FIG. 1G, the digital form input system can identify the letters "J," "O," and "E" from the drawing input 120 (shown in FIG. 1C) and provide the digital text characters as the modified drawing 160.

As mentioned, the digital form input system can also modify digital text characters. For instance, the digital form input system can modify digital text characters based on a field (e.g., a field boundary). To illustrate, in one or more embodiments, the digital form input system selects a font, font size, font spacing, font height, font format, or other font characteristic such that digital text characters will fit within a field boundary. For example, with regard to FIG. 1G, the digital form input system identifies the letters "J," "O," and "E" and selects a font and font-size based on the boundary 114a of the field 112a. Specifically, the digital form input system selects a font and font size such that the modified drawing 160 fits within the boundary 114a of the field 112a.

As discussed above, the digital form input system can operate in conjunction with a variety of fields, including check box fields. In particular, the digital form input system can identify a check box field corresponding to drawing input and provide drawing input for display via check box fields. For example, FIGS. 2A-2C illustrate receiving drawing input, identifying a check box field corresponding to the drawing input, and providing the drawing input for display within a boundary of the check box field.

Figure 2A:
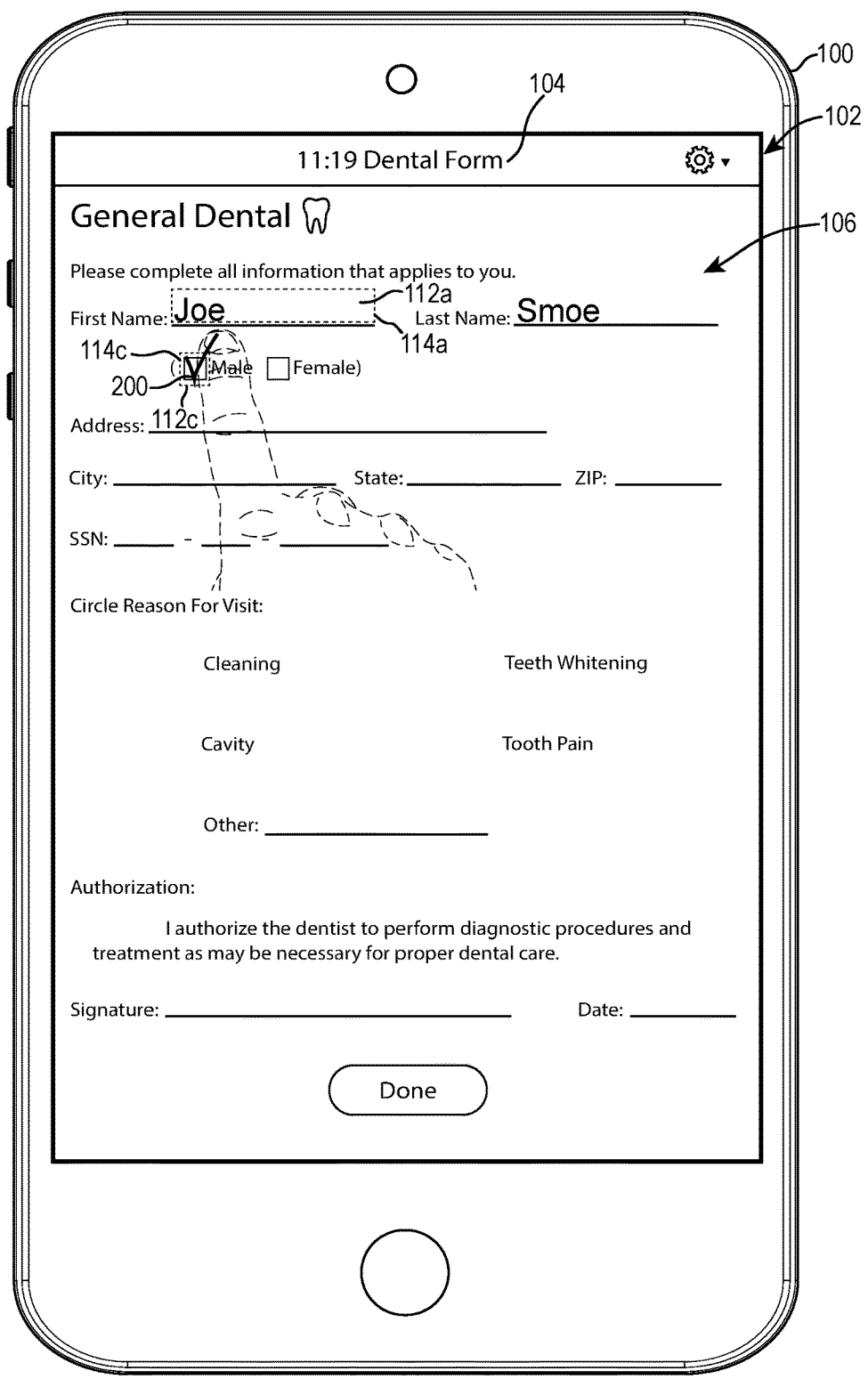
FIGS. 2A-2C illustrate a computing device receiving, modifying, assigning, and displaying drawing input in relation to a field in accordance with one or more embodiments.
Figure 2B:
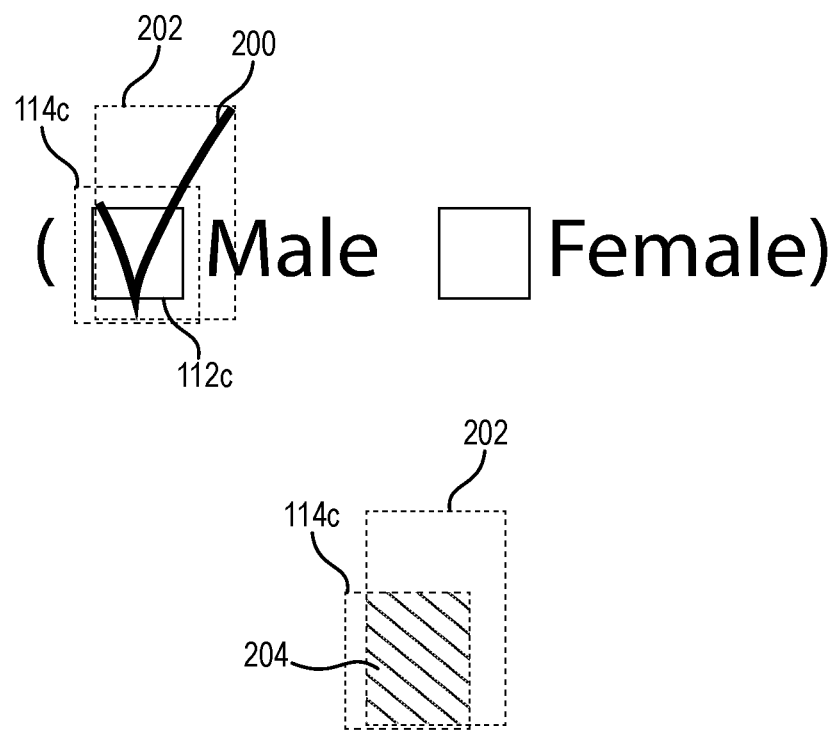
Figure 2C:
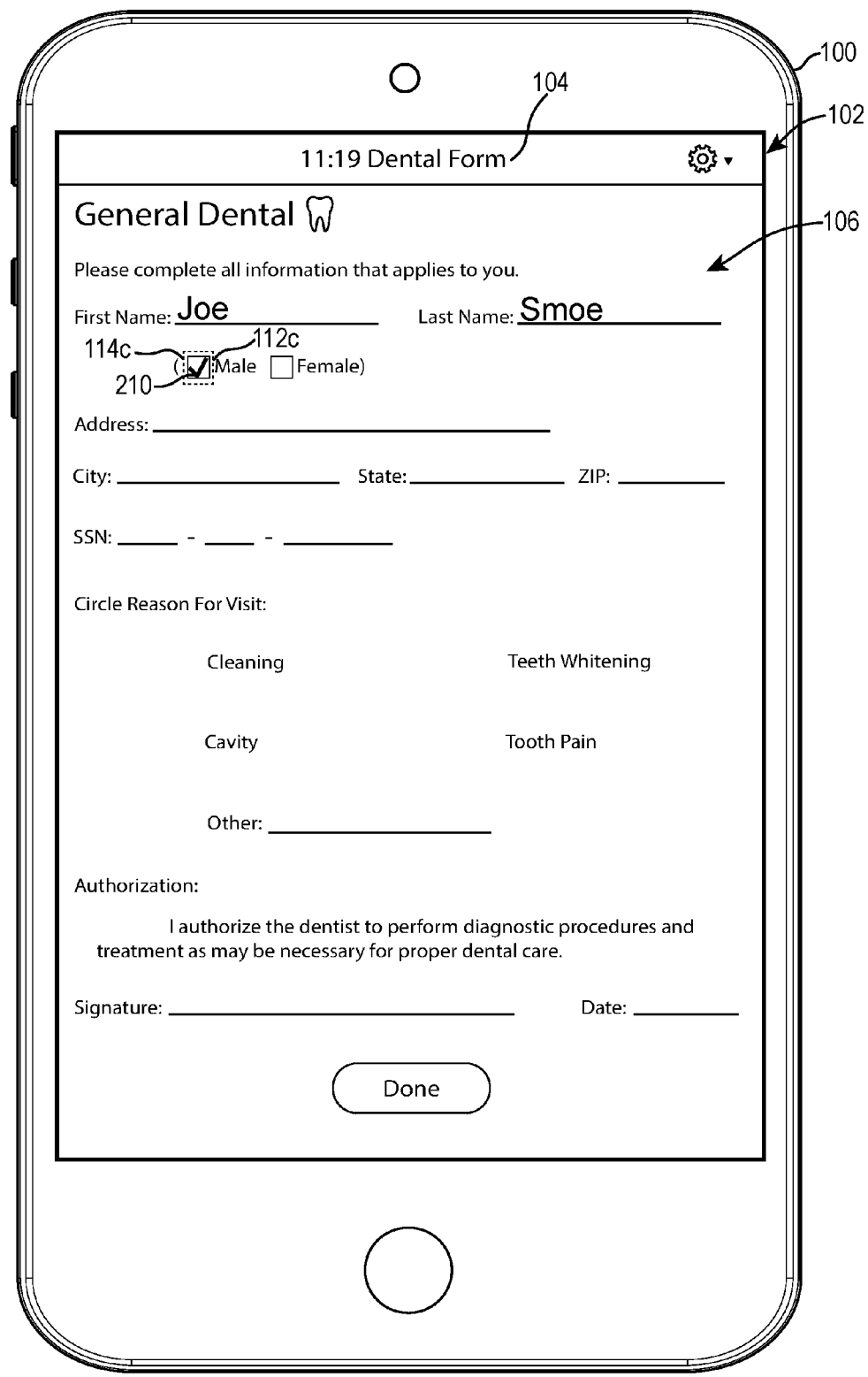

Specifically, FIG. 2A illustrates the computing device 100 displaying the electronic document 106 via the user interface 104. In particular, FIG. 2A illustrates the electronic document 106 upon receiving drawing input 200. As described above, the digital form input system can determine that the drawing input 200 corresponds to the check box field 112c. In particular, the digital form input system can count drawing units of the drawing input 200 that are located within the boundaries 114a-114n of the fields 112a-112n and determine that the field 112c has the greatest number of drawing units within the boundary 114c.

It will be appreciated that in some circumstances counting and comparing a number drawing units alone may assign drawing input to an incorrect field. Indeed, because smaller fields have a relatively smaller area, smaller fields tend to have fewer drawing units located within their boundaries. Accordingly, larger fields may have a greater number of drawing units within their boundaries, even though a user does not intend to provide drawing input in relation to the larger fields. For example, in relation to FIG. 2A, because of the relatively small size of the boundary 114c, if a small number of drawing units of the drawing input 200 lie within the boundary 114a, the number of drawing units within the boundary 114a may actually exceed the number of drawing units within the boundary 114c.

To account for this circumstance, in one or more embodiments, the digital form input system determines that drawing input corresponds to a particular field by measuring whether a field is encompassed by the drawing input. For example, the digital form input system can determine that an input region (e.g., a box circle, polygon, or other shape) surrounding the drawing input covers a corresponding boundary of a field. Based on that determination, the digital form input system can identify an appropriate field to assign drawing input.

For example, in relation to FIG. 2A, the digital form input system can determine that an input region corresponding to the drawing input 200 encompasses (e.g., covers or surrounds) the boundary 114c of the field 112c. Specifically, the digital form input system can determine that a box around the drawing input 200 encompasses the boundary 114c. In response to this determination, the digital form input system can assign the drawing input 200 to the field 112c. By assigning the drawing input 200 based on whether the drawing input 200 encompasses a boundary of a field, the digital form input system can avoid improperly assigning the drawing input 200 to an incorrect field.

It will be appreciated that in some circumstances drawing input may nearly, but not entirely, encompass a field boundary. For example, the drawing input 200 may only encompass 95% of the field 112c. In one or more embodiments, the digital form input system accounts for such circumstances by assigning drawing input to a field based on a threshold percentage of coverage (e.g., assign drawing input to a field where the drawing input encompasses 90% or more of a field).

Moreover, rather than automatically selecting a field encompassed by drawing input, in one or more embodiments, the digital form input system applies a greater weight to drawing units located within a field that is encompassed by an input region associated with drawing input. For example, the digital form input system can determine that the input region corresponding to drawing input 200 encompasses the boundary 114c. In response, the digital form input system can apply a multiplier (e.g., a two times multiplier) to the drawing units located within the boundary 114c. Accordingly, upon comparing the drawing units located within various fields, the digital form input system can emphasize the drawing units located within the boundary 114c (i.e., because the boundary 114c is encompassed by the input region of drawing input 120).

Along similar lines, in one or more embodiments, the digital form input system identifies an amount of overlap between drawing input and each field in a plurality of fields (e.g., a plurality of field boundaries) and selects a field based on the amount of overlap. In particular, in one or more embodiments, the digital form input system identifies an amount of overlap between an input region and each field in a plurality of fields and selects the field with the greatest amount of overlap.

For example, FIG. 2B illustrates selecting a field based on an amount of overlap in accordance with one or more embodiments. Specifically, FIG. 2B illustrates the drawing input 200 in relation to the boundary 114c of the field 112c. Moreover, in relation to FIG. 2B, the digital form input system identifies an input region 202 corresponding to the drawing input 200.

As shown, the digital form input system determines an amount of overlap 204 between the input region 202 and the field 112c (i.e., overlap between the input region 202 and the boundary 114c). Moreover, the digital form input system determines that the greatest amount of overlap of the fields 112a-112n corresponds to the field 112c (i.e., out of the boundaries 114a-114n, only the boundary 114c overlaps the input region 202). Based on the determination that the greatest amount of overlap corresponds to the field 112c, the digital form input system selects the field 112c. In this manner, the digital form input system can select a field corresponding to digital input based on a number of drawing units of drawing input within a field boundary and/or based on an amount of overlap between an input region and a field boundary.

Although the input region 202 is portrayed as a rectangle, it will be appreciated that the digital form input system can identify, generate, or determine an input region in a variety of shapes or forms. For example, rather than identifying a rectangular input region, the digital form input system can identify an input region in the shape of a circle, polygon, oval, or other shape.

In addition to comparing an amount of overlap in relation to an input region, the digital form input system can also compare a location of an input region to a location of a field. For example, in one or more embodiments, the digital form input system selects a field by comparing a location of a center point of an input region to a location of a center point of a field. To illustrate, in one or more embodiments, the digital form input system can select a field with the closest center point to the center point of an input region.

In one or more embodiments, the digital form input system applies different horizontal and/or vertical criteria in selecting a field corresponding to drawing input. Indeed, in one or more embodiments, the digital form input system selects a field by determining whether a field is a horizontal match and/or whether a field is a vertical match to drawing input. The digital form input system can apply different algorithms/criteria to determine whether a field is a horizontal match and/or a vertical match. The digital form input system can then combine the algorithms/criteria to make a final selection.

For example, in one or more embodiments, the digital form input system compares a location of a center point of an input region with locations of center points of a plurality of fields. Based on the comparison, the digital form input system determines that a first field is a vertical match (e.g., the center point of the first field is within the closest vertical proximity to the center point of the input region). The digital form input system can then apply other criteria to determine if the first field is also a horizontal match (e.g., based on the amount of overlap between the first field and the input region and/or the amount of drawing input falling within the first field boundary). The digital form input system can then combine vertical and/or horizontal criteria to select a field (e.g., calculate a vertical score and a horizontal score and combine the vertical score and the horizontal score to select a field with the highest total score). It will be appreciated that the digital form input system can utilize any of the methods described herein to identify horizontal and/or vertical matches and to select a field corresponding to drawing input.

Moreover, as previously discussed, after identifying a field corresponding to drawing input, the digital form input system can also provide the drawing input for display. In particular, the digital form input system can provide the drawing input for display by resizing/translating the drawing input to fit within a boundary (or the digital form input system can convert the drawing input to digital text characters and provide the digital text characters for display within the boundary). Accordingly, as shown in FIG. 2C, the digital form input system converts the drawing input 200 to a digital text character 210 and provides the digital text character 210 for display within the boundary 114c of the field 112c.

It will be appreciated that, in some circumstances, a user may provide drawing input that overlaps a number of different fields. For example, and as discussed above, because the interface area 110 can cover multiple fields within an electronic document, a user may provide drawing input via the interface area 110 that results in various portions of the drawing input overlapping the multiple fields. In such circumstances, the digital form input system can still identify a field corresponding to the drawing input and automatically provide the drawing input for display within the corresponding field.

Figure 3A:
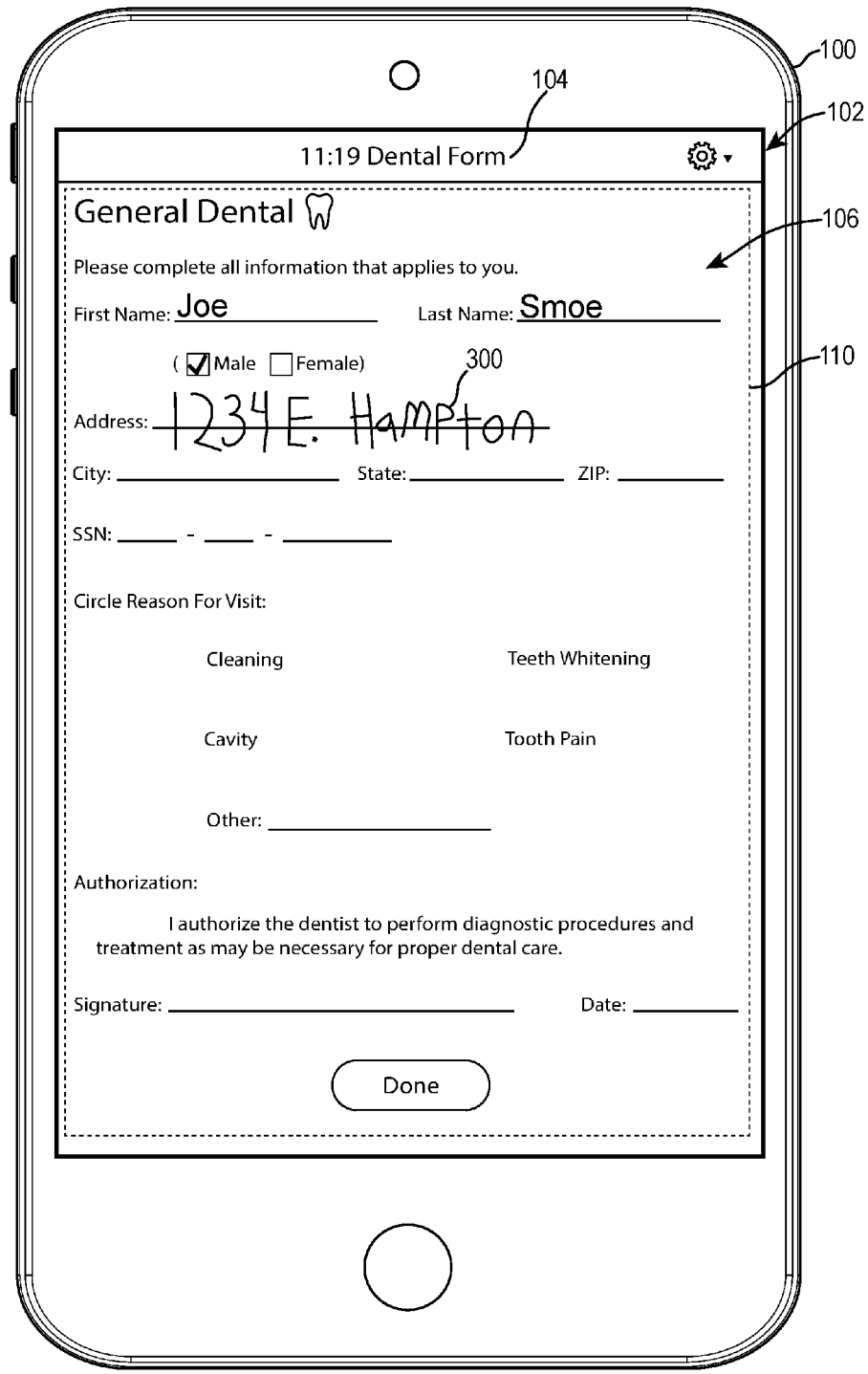
FIGS. 3A-3B illustrate receiving drawing input across multiple fields, identifying a corresponding field, and providing the drawing input via the corresponding field in accordance with one or more embodiments.

For example, FIG. 3A illustrates the computing device 100 and the electronic document 106. In particular, FIG. 3A shows the interface area 110 receiving drawing input 300. As shown, the drawing input 300 is an address that extends across multiple different fields (as shown in more detail in FIG. 3B). In particular, in one or more embodiments, the digital form input system identifies an amount of the drawing input 300 within each field boundary and then determines the field with the greatest amount.

Figure 3B:
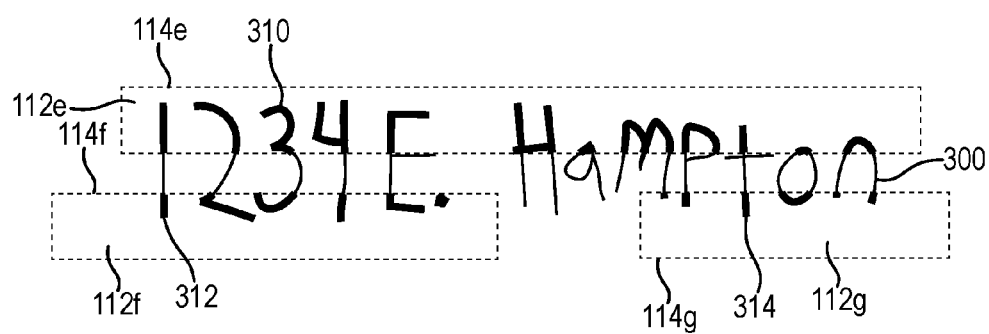

Indeed, as shown in FIG. 3B, the digital form input system identifies a first portion 310 of the drawing input 300 located within the boundary 114e of the field 112e (i.e., the bold portions within boundary 114e), a second portion 312 of the drawing input 300 located within the boundary 114f of the field 112f (i.e., the bold portions within boundary 114f), and a third portion 314 of the drawing input 300 located within the boundary 114g of the field 112g (i.e., the bold portions within boundary 114g). Accordingly, in certain embodiments, the digital form input system identifies a field corresponding to the drawing input 300 by comparing the first portion 310, the second portion 312, and the third portion 314. Specifically, the digital form input system determines that the first portion 310 is the greatest (i.e., contains the most drawing units). Based on that determination, the digital form input system assigns the drawing input 300 to the field 112e.

In addition to the foregoing example, it will be appreciated that the digital form input system can determine an amount of drawing units corresponding to a field based on an area of overlap. For example, as described above, the digital form input system can identify a field based on an amount of overlap between an input region and one or more field boundaries. In particular, the digital form input system can determine an input region (e.g., a rectangular bounding box) corresponding to the drawing input 300, identify an amount of overlap between the input region and each of the fields 112e-112g (i.e., the field boundaries 114e-114g), and determine that the field 112e has the greatest amount of overlap.

Although the embodiment shown in FIG. 3B identifies a field corresponding to drawing input by comparing portions or amounts of drawing input falling within field boundaries, it will be appreciated that in one or more embodiments, the digital form input system can also identify a field corresponding to drawing input based on a starting position of the drawing input. For example, the digital form input system can assign drawing input to a field based on where the drawing input begins. Specifically, the digital form input system can automatically assign a drawing input based on the field corresponding to the starting position of the drawing input.

To illustrate, in relation to FIG. 3B, the digital form input system can determine that the drawing input 300 begins within the boundary 114e of the field 112e. The digital form input system can utilize this determination to assign the drawing input 300. For example, in one or more embodiments, the digital form input system can automatically assign the drawing input 300 to the field 112e based on the determination that the starting position of the drawing input 300 is located within the boundary 114e of the field 112e.

In one or more embodiments, rather than automatically assigning drawing input to a field corresponding to a starting point, the digital form input system can weight a field based on a starting point. For example, the digital form input system can apply a weight to the field 112e based on a determination that the starting position of the drawing input 300 is located within the boundary 114e of the field 112e. For instance, the digital form input system can apply a weight to the field 112e by applying a multiplier (e.g., a multiplier of two) to the number of drawing units located within the field 112e prior to comparing the number of drawing units located within the field 112e to the number of drawing units located within the fields 112f and 112g.

To illustrate, if the digital form input system detects fifty drawing units in the field 112e, seventy drawing units in the field 112f, and eighty drawing units in the field 112g, upon determining that the starting position of the drawing input 300 is located within the field 112e, the digital form input system can apply a two times multiplier to the number of drawing units in the field 112e. Thus, the digital form input system would compare one-hundred drawing units corresponding to the field 112e (i.e., fifty drawing units times two), seventy drawing units located within the field 112f, and eighty drawing units located within the field 112g. Based on the comparison, in such circumstances, the digital form input system can assign the drawing unit 300 to the field 112e.

It will be appreciated that the digital form input system can weight any measurement of drawing input. For example, in one or more embodiments, the digital form input system weights an amount of overlap between an input region and one or more fields. Specifically, the digital form input system can weight a first amount of overlap between an input region and a first field (based on a determination that a starting position lies within the first field).

In addition to the previous examples, the digital form input system can apply a variety of different weights in response to a variety of different factors. For example, in one or more embodiments, the digital form input system normalizes drawing input based on field area. In particular, the digital form input system can determine an area corresponding to each field and a number of drawing units corresponding to each field to determine a normalized number of drawing units based on field area. Moreover, the digital form input system can select a field based on the normalized number of drawing units.

To illustrate, in relation to FIG. 3B, the digital form input system can calculate the number of drawing units within the fields 112e-112g and normalize the drawing units based on the area of each of the fields 112e-112g. For instance, consider a scenario where one-hundred drawing units fall within the field 112e (the field 112e having an area of one-hundred area units), fifty units fall within the field 112f (the field 112f having an area of sixty area units), and forty drawing units fall within the field 112g (the field 112g having an area of fifty area units). The digital form input system can determine a normalized drawing unit of one for the field 112e (i.e., one-hundred drawing units divided by one-hundred area units), a normalized drawing unit of 0.83 for the field 112f (i.e., fifty drawing units divided by sixty area units); and a normalized drawing units of 0.8 for the field 112g (i.e., forty drawing units divided by fifty area units).

Similarly, the digital form input system can also normalize an amount of overlap. In particular, the digital form input system can determine amounts of overlap between an input region and each field in an electronic document and then normalize the amounts of overlap based on the area of each field. To illustrate, consider a first field having an area of one-hundred that overlaps an input region by an area of eighty and a second field having an area of eighty that overlaps the input region by an area of sixty. In one or more embodiments, the digital form input system determines a normalized amount of overlap for the first field of 0.8 (i.e., eighty divided by one-hundred) and a normalized amount of overlap for the second field of 0.75 (i.e., sixty divided by eighty). The digital form input system can compare the normalized amounts of overlap and select a field corresponding to the drawing input (e.g., select the first field because it has a higher normalized amount of overlap).

In addition to normalizing drawing units, the digital form input system can apply weights to drawing units based on an order of receiving drawing units and/or a relative position of fields within an electronic document. For instance, in one or more embodiments, the digital form input system can detect whether fields are horizontally aligned (e.g., whether a field is located within a vertical threshold distance of other fields). Based on a determination that fields are horizontally aligned, in one or more embodiments, the digital form input system weights drawing units more heavily based on a sequential order that the drawing units are received (i.e., drawing units received earlier in time are weighted more heavily than drawing units received later in time).

Figure 4A:
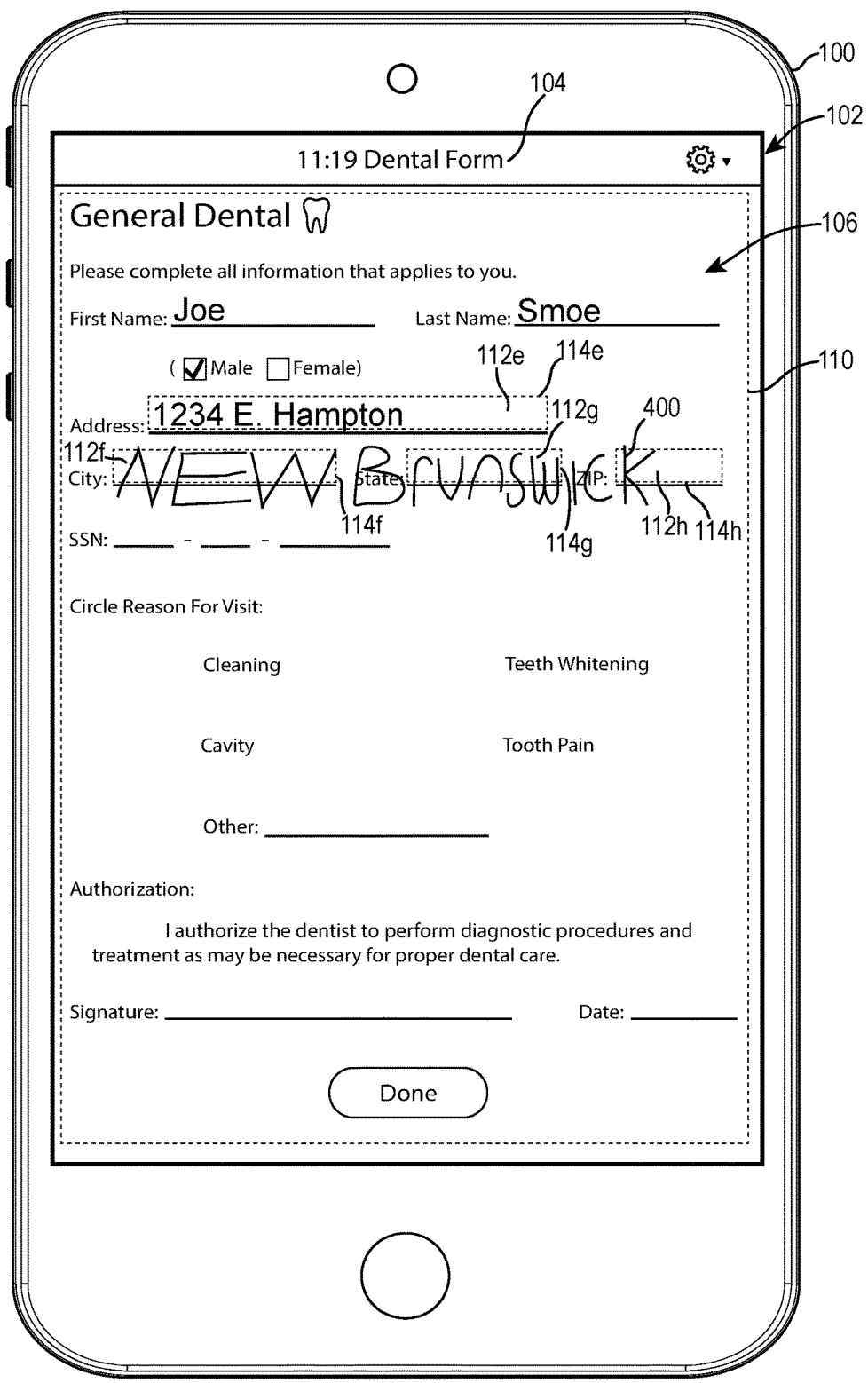
FIGS. 4A-4D illustrate receiving drawing input across multiple fields, weighting fields, identifying a corresponding field, and providing the drawing input via the corresponding field in accordance with one or more embodiments.

For example, FIG. 4A illustrates the interface area 110 receiving drawing input 400 in relation to the electronic document 106 on the computing device 100. As shown, the drawing input 400 comprises a relatively long name of a city ("New Brunswick") that crosses multiple field boundaries. In particular, due to the size of the drawing input 400 and the relative location of fields within the electronic document 106, the drawing input 400 crosses field boundaries related to city, state, and zip code.

Figure 4B:
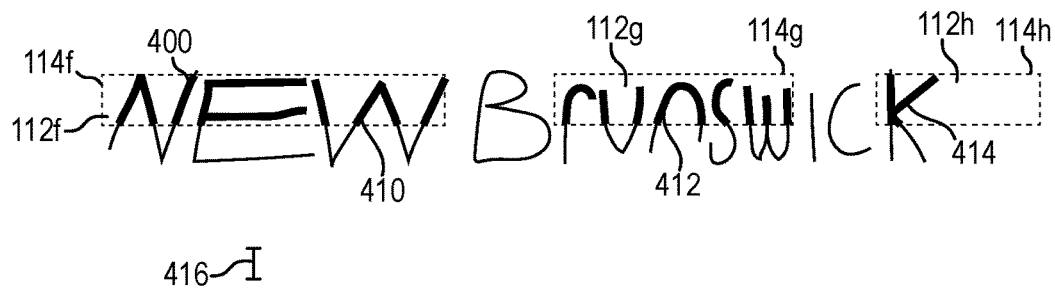

As described above, the digital form input system can determine an amount of the drawing input 400 located within boundaries of individual fields. For example, as shown in FIG. 4B the digital form input system can determine a first portion 410 located within the boundary 114f of the field 112f, a second portion 412 located within the boundary 114g of the field 112g, and a third portion 414 located within the boundary 114h of the field 112h. Notably, however, due to the fact that boundaries 112f-112h are horizontally aligned and the drawing input 400 is relatively long, the portion 414 located within the boundary 114g is the greatest portion of the drawing input 400 falling within field boundaries. Thus, failing to take into consideration the order in which drawing input is received, can result in assigning drawing input to incorrect fields (i.e., assigning the drawing input to a field that differs from user intent).

Accordingly, as described above, in one or more embodiments, the digital form input system can weight drawing input based on an order and/or time of receiving drawing input. For instance, the digital form input system can weight drawing input received at an initial period of time more heavily than drawing input received at a subsequent period of time. More specifically, the digital form input system can weight drawing input received at a first period of time located within a first field boundary more heavily than drawing input received at a second (subsequent) period of time located within a second field boundary. Similarly, the digital form input system can weight drawing input received at the second period of time located within the second field boundary more heavily than drawing input received at a third (subsequent) period of time located within a third field boundary.

Figure 4C:
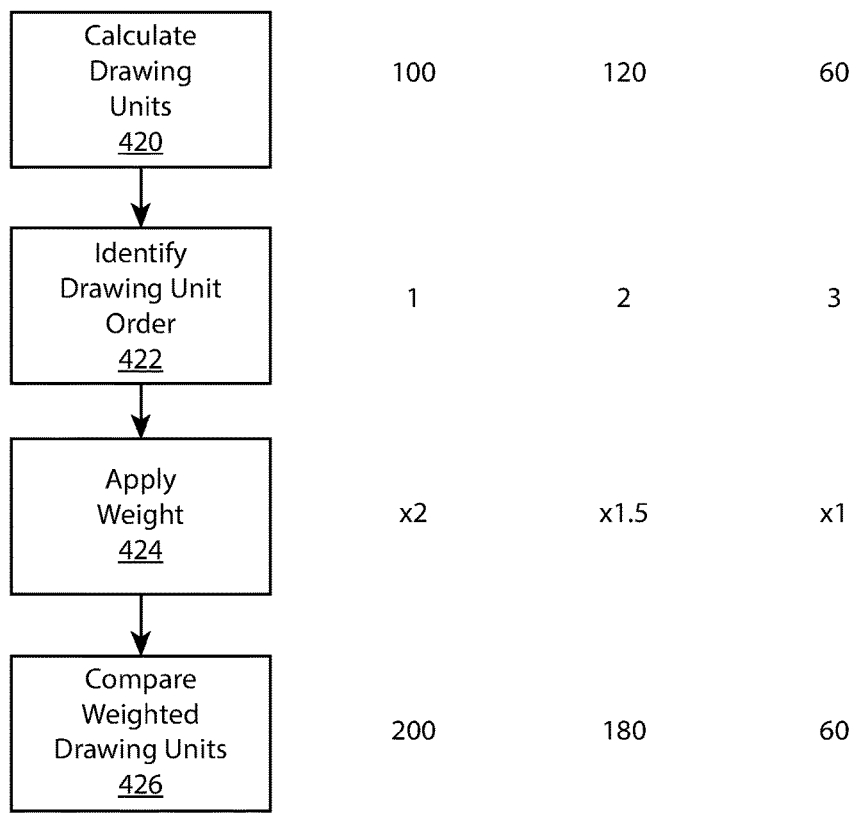

For example, in relation to FIG. 4C, the digital form input system identifies drawing units (e.g., portions) corresponding to each field 112f-112h by applying steps 420-426. In particular, the digital form input system performs the step 420 of calculating drawing units; performs the step 422 of identifying a drawing unit order; performs the step 424 of applying a weight; and performs the step 426 of comparing the weighted drawing units.

More particularly, the digital form input system can perform the step 420 of calculating drawing units by determining a portion of drawing input that falls within a field boundary. For example, as illustrated in relation to FIGS. 4B and 4C, the digital form input system determines that the portion 410 falling within the boundary 114*f* of the field 112*f* contains 100 drawing units, the portion 412 falling within the boundary 114*g* of the field 112*g* contains 120 drawing units, and the portion 414 falling within the boundary 114*h* of the field 112*h* contains 60 drawing units.

Moreover, as shown in relation to step 422 of FIG. 4C, the digital form input system also determines an order in which the digital form input system (e.g., via the interface area 110) receives the drawing units. In particular, the digital form input system determines that the interface area 110 receives drawing units corresponding to the field 112*f* (i.e., the portion 410) over a first (initial) period of time, receives the drawing units corresponding to the field 112*g* (i.e., the portion 412) over a second (subsequent) period of time, and receives the drawing units corresponding to the filed 112*h* (i.e., the portion 414) over a third (final) period of time.

As illustrated in relation to step 424 of FIG. 4C, the digital form input system then calculates and applies weights to the drawing units. In particular, as shown in FIG. 4C the digital form input system applies a multiplier of 2 to the first portion 410, a multiplier of 1.5 to the second portion 412, and no multiplier to the third portion 414. This results in weighted drawing units of 200, 180, and 60 in relation to the portions 410-414 respectively.

Figure 4D:
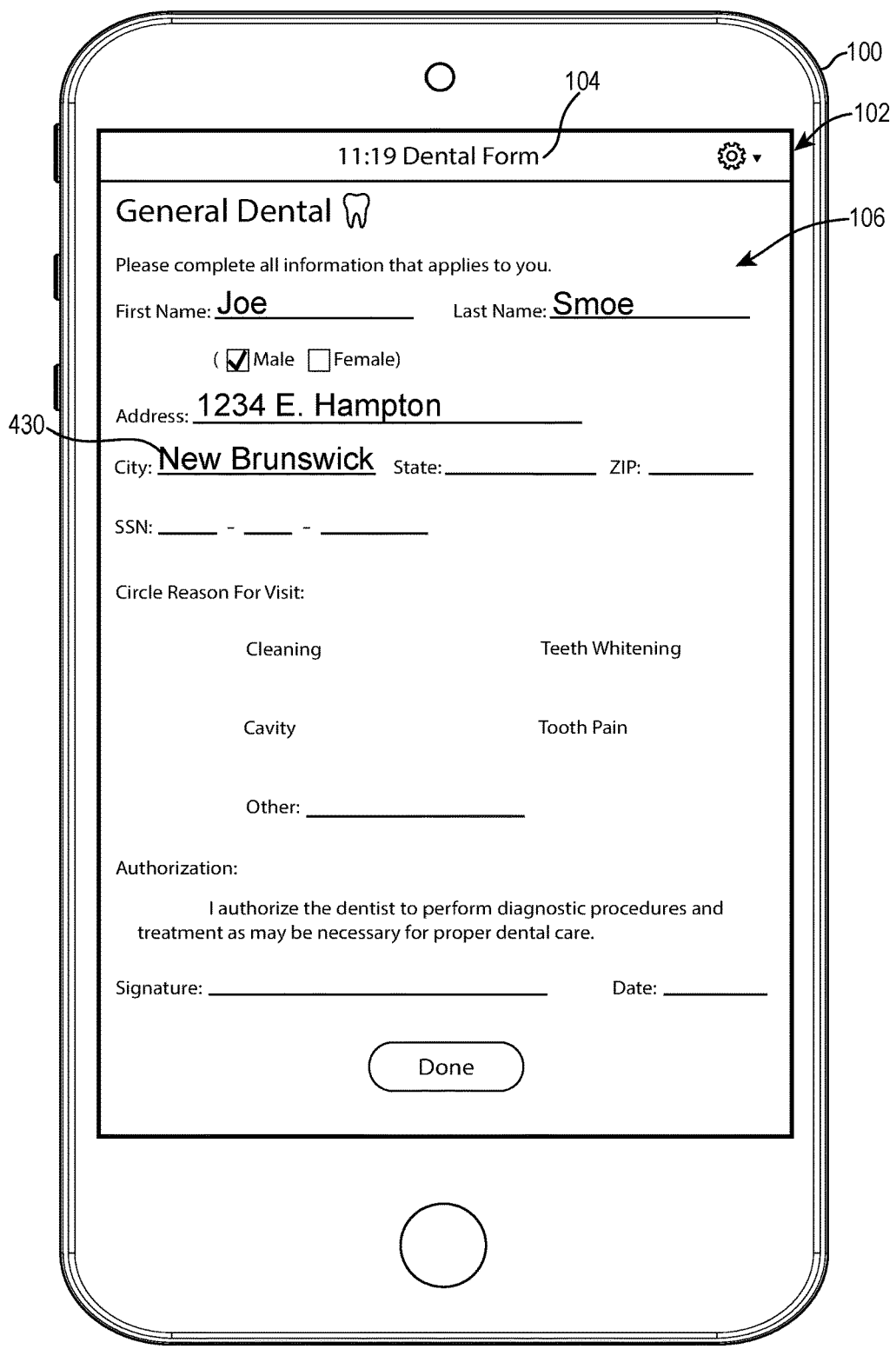

Further, the step 426 of FIG. 4C shows that, upon calculating and applying weights to the drawing units, the digital form input system also compares the weighted drawing units to identify a field corresponding to the drawing input 400. Specifically, the digital form input system determines that the first portion 410 corresponding to the field 112*f* has the greatest number of weighted drawing units. Accordingly, the digital form input system assigns the drawing input 400 to the field 112*f*. Moreover, as illustrated in FIG. 4D, the digital form input system modifies the drawing input 400 to generate digital text characters 430 and provides the digital text characters 430 for display within the boundary 114*f* of the field 112*f*.

It will be appreciated that although FIG. 4C illustrates particular multipliers corresponding to particular time periods and fields, the digital form input system can utilize a variety of different multipliers based on a variety of different time periods, factors, and fields. For example, the digital form input system can apply a weight solely based on time period (e.g., apply a five times multiplier to the first half-second of drawing input received). Similarly, the digital form input system can apply a weight based on a percentage of drawing input (e.g., apply a three times multiplier to the first ten percent of drawing input received). Moreover, the digital form input system can apply a weight based solely on the first field (e.g., apply a two times multiplier to drawing input in the first field to receive drawing input)

Moreover, although FIG. 4C illustrates applying two weights (a multiplier of 2 and a multiplier of 1.5) based on an order of receiving drawing input, it will be appreciated that the digital form input system can utilize a variety of weights calculated based on one or more alternative weighting algorithms. For example, in one or more embodiments, the digital form input system applies a variable weight to drawing units based on a decaying weight algorithm. For instance, the digital form input system can calculate a weight based on an algorithm that decays over time (e.g., linear decay, exponential decay, or logarithmic decay). Accordingly, in one or more embodiments, the digital form input system weights each drawing unit individually, such that drawing units that are received earlier in time have more impact in selecting a field than drawing units received at a later time.

Furthermore, the digital form input system can also utilize a variety of factors to determine whether to apply one or more weights. For example, the digital form input system can determine that drawing input is located in a plurality of fields that are aligned horizontally. In response, the digital form input system can apply one or more weights. Specifically, in one or more embodiments, the digital form input system applies a vertical threshold distance, and, if fields lie within the vertical threshold distance, the digital form input system weights drawing input based on an order of receiving the drawing input. In this manner, the digital form input system can account for situations where drawing input extends into adjacent horizontal fields. Thus, it will be appreciated that the digital form input system does not always apply weights when more than one field has drawing input located within its boundaries. Rather, the digital form input system can selectively apply weights in particular circumstances.

For example, in relation to FIGS. 4B, 4C, the digital form input system applies weights in response to first determining that the field 112*f* is within a threshold distance of the fields 112*g* and 112*h*. Specifically, the digital form input system applies a vertical threshold distance 416 and determines that the field 112*f* is within the vertical threshold distance 416 of the fields 112*g* and 112*h* (e.g., common reference points of the boundaries 114*f*-114*h*, such as the top, middle, or bottom lie within the vertical threshold distance 416). Accordingly, the digital form input system determines that the fields 112*f*-112*h* are horizontally aligned. In response, the digital form input system applies weights based on the order of receiving the drawing input 400.

In addition to applying weights based on fields falling within a threshold distance, the digital form input system can also take into consideration the existence of digital content within one or more fields when assigning drawing input. For instance, in one or more embodiments, the digital form input system can de-emphasize fields that already have digital content (e.g., drawing input and/or digital text characters) in selecting a field for drawing input. For example, in one or more embodiments, the digital form input system identifies fields that already contain digital content and applies a weight that de-emphasizes the identified fields. More specifically, the digital form input system can apply a multiplier to drawing units located within boundaries of fields that already contain digital content.

To illustrate, in relation to FIG. 4A the field 112*e* already contains drawing input (e.g., "1234 E. Hampton"). If the drawing input 400 extends into the field 112*e*, in one or more embodiments, the digital form input system determines that the field 112*e* already contains digital content (i.e., digital text characters). In response, the digital form input system can de-emphasize the field 112*e* in selecting a field corresponding to the drawing input 400 by applying a weight (e.g., 0.5) to drawing input located within the boundary 114*e* of the field 112*e*. In this manner, the digital form input system can de-emphasize fields that already contain digital content while emphasizing fields that do not have any digital content.

It will be appreciated that rather than applying a weight to fields already containing digital content, the digital form input system can employ a variety of other methods in de-emphasizing such fields. For instance, in one or more embodiments, the digital form input system omits fields that already have digital contents in selecting a field corresponding to drawing input. To illustrate, with regard to FIG. 4A the digital form input system can determine that the field 112e already contains digital content. In response, the digital form input system can omit the field 112e in selecting a field corresponding to the drawing input 400 (e.g., field 112e is removed from the field identification algorithm).

Moreover, in yet other embodiments, the digital form input system does not consider whether a field already contains digital content in selecting a field corresponding to drawing input. In such embodiments, the digital form input system simply treats fields already containing digital content the same as fields that do not contain digital content. If a field is selected that already contains digital content, the digital form input system can replace existing digital content with new drawing input. For example, if the digital form input system assigned the drawing input 400 to the field 112e, the digital form input system can replace the existing digital content (i.e., "1234 E. Hampton") with drawing input 400 (i.e., "New Brunswick").

It will be appreciated that, in some circumstances, the amount of drawing input located within a plurality of fields may be nearly identical (e.g., a first field may have 91 drawing units and a second field may have 92 drawing units). In such circumstances, the risk is heightened for assigning digital input to an inappropriate field. In one or more embodiments, the digital form input system accounts for such circumstances by obtaining confirmation from a user. For example, in one or more embodiments, the digital form input system determines that the amount of drawing input located within two fields falls within an error margin threshold (e.g., the amount of drawing input corresponding to two fields is within three percent). In response, the digital form input system can highlight the two fields and provide a visual element to the user (via the user interface 104) prompting to the user to select one of the two fields corresponding to the drawing input.

Similarly, in one or more embodiments, upon determining that the amount of drawing input located within two fields falls within an error margin threshold, the digital form input system assigns the drawing input to the field with the greater amount of drawing input. In addition, the digital form input system provides a selectable change field element (via the user interface 104) for display to the user. A user can select the change field element, and in response, the digital form input system can change the drawing input from the assigned field to the other field.

Figure 5A:
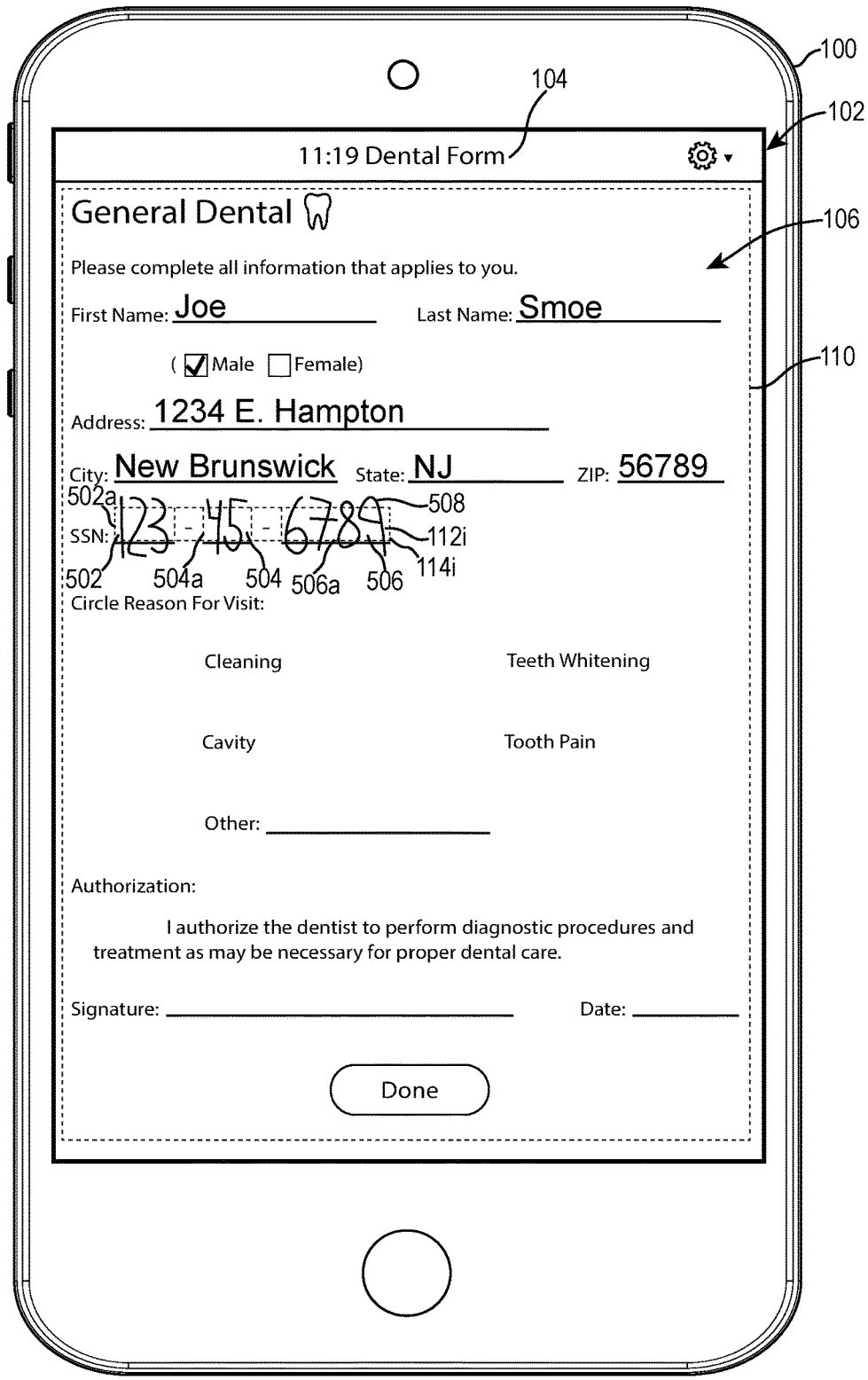
FIGS. 5A-5E illustrate receiving drawing input, identifying a field with a plurality of sub-sections, and providing drawing input in accordance with one or more embodiments.

Turning now to FIGS. 5A-5E additional detail will be provided regarding receiving, assigning, and providing drawing input for display in relation to a field with a plurality of sub-sections. For example, FIG. 5A illustrates the electronic document 106 with a field 112i having a boundary 114i (i.e., a field for entry of a social security number having nine characters divided into a group of three characters, a group of two characters, and a group of four characters). As shown, the field 112i includes a first sub-section 502 having a first boundary 502a, a second sub-section 504 having a second boundary 504a, and a third sub-section 506 having a third boundary 506a. Moreover, as illustrated in FIG. 5A, the digital form input system receives drawing input 508 in relation to the electronic document 106 via the interface area 110.

Figure 5B:
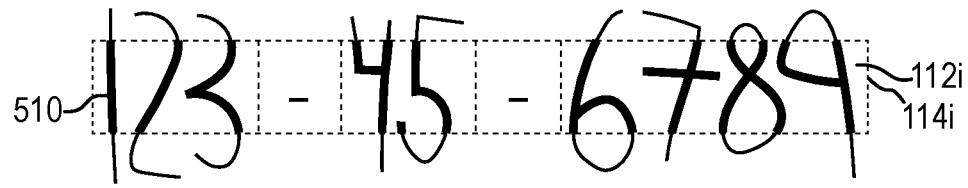

As shown in FIG. 5B, in response to receiving the drawing input 508, the digital form input system can identify a field corresponding to the drawing input 508. In particular, the digital form input system receives the drawing input 508 via the interface area 110 and determines an amount 510 of the drawing input 508 located within the boundary 114i of the field 112i. Moreover, based on the amount 510 (i.e., a determination that the amount 510 is greater than any other amount of drawing input corresponding to any other field), the digital form input system can determine that the drawing input 508 corresponds to the field 112i.

Figure 5C:
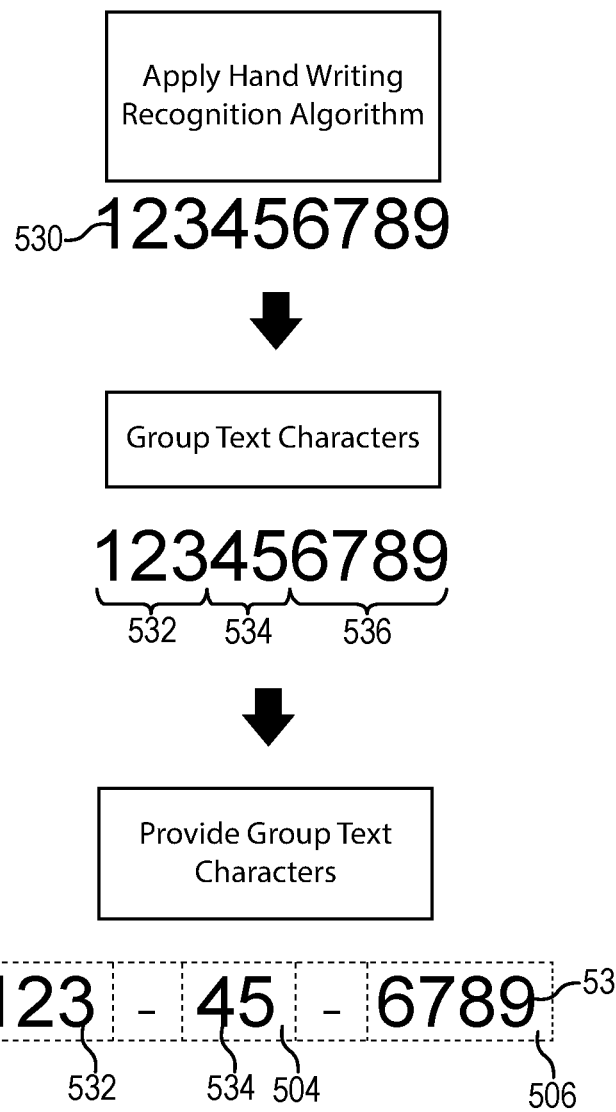
Figure 5D:
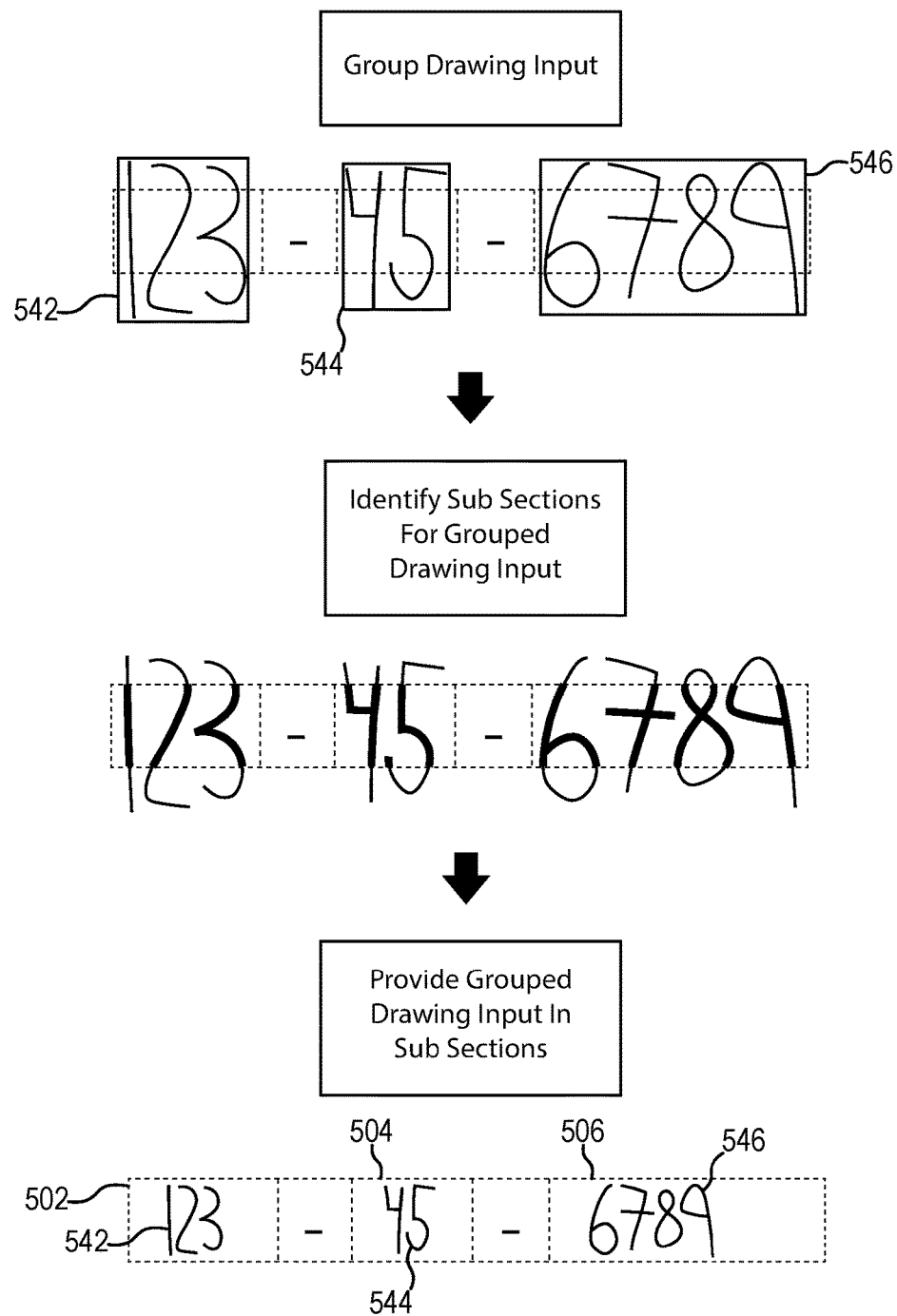

Upon determining that drawing input corresponds to a field, the digital form input system can determine what portions of the drawing input correspond to sub-sections of the field. For instance, in embodiments where the digital form input system converts drawing input to digital text characters, the digital form input system can group the digital text characters and provide them for display in sub-sections of the field. In embodiments where the digital form input system does not convert to digital text characters, the digital form input system can group drawing input and provide the groups for display in sub-sections of the field. FIGS. 5C and 5D respectively illustrate grouping digital text characters and drawing input in relation to fields with a plurality of sub-sections.

As shown in FIG. 5C, upon determining that the drawing input 508 corresponds to the field 112i, the digital form input system applies a hand writing recognition algorithm to the drawing input 508. In particular, as described above, the digital form input system applies a handwriting recognition algorithm that utilizes optical character recognition techniques to identify and classify characters of the drawing input 508 and convert the drawing input 508 into digital text characters 530.

As illustrated in FIG. 5C, upon identifying the digital text characters 530 from the drawing input 508 the digital form input system groups the text characters. In particular, the digital form input system groups the text characters based on the field 112i. For instance, the digital form input system determines that the field 112i comprises three sub-sections 502, 504, and 506 (each sub-section supporting three, two, and four characters respectively). Based on this determination, the digital form input system divides the digital text characters into a first group 532 (having three characters), a second group 534 (having two characters), and a third group 536 (having four characters).

After separating the digital text characters into the groups 532, 534, 536, the digital form input system can provide the grouped text characters for display. Specifically, the digital form input system can display each group 532, 534, 536 in relation to a corresponding sub-section of the field 112i. Thus, as shown in FIG. 5C, the digital form input system provides the first group 532 for display within the boundary 502a of the first sub-section 502, provides the second group 534 for display within the boundary 504a of the second sub-section 504, and provides the third group 536 for display within the boundary 506a of the third sub-section 506.

As mentioned previously, the digital form input system can also provide drawing input for display in fields without converting the drawing input into digital text characters. In particular, in one or more embodiments, the digital form input system can apply an algorithm (e.g., a handwriting recognition algorithm and/or clustering algorithm) to group drawing input into individual characters, words, or groups. Specifically, the digital form input system can group drawing input based on characteristics of the field (e.g., the number of sub-sections and corresponding characters).

For example, as shown in FIG. 5D the digital form input system groups the drawing input 508. Specifically, the digital form input system applies a clustering algorithm (i.e., k-means clustering) that clusters the drawing input 508 into three groups (i.e., based on the number of sub-sections in the field 112i). Accordingly, the digital form input system generates a first group 542, a second group 544, and a third group 546 from the drawing input 508.

Although the embodiment of FIG. 5D utilizes a k-means clustering algorithm, it will be appreciated that the digital form input system can apply any type of clustering algorithm or a handwriting recognition algorithm to group the drawing input 508. For example, in one or more embodiments, the digital form input system can utilize an optical character recognition to identify individual characters from the drawing input 508 and then (rather than converting the characters to digital text characters), the digital form input system groups the characters based on characteristics of the field 112i.

As shown in FIG. 5D, the digital form input system can also identify sub-sections within a field corresponding to grouped drawing input. For example, the digital form input system can determine (e.g., based on position and/or the number of characters) that the first group 542 corresponds to the first sub-section 502, that the second group 544 corresponds to the second sub-section 504, and that the third group 546 corresponds to the third sub-section 506. Specifically, in relation to the embodiment of FIG. 5D, the digital form input system determines that groups 542-546 correspond to particular sub-sections based on an amount of each group that is located within particular sub-sections.

Moreover, as shown in FIG. 5D, the digital form input system provides the grouped drawing input for display within corresponding sub-sections. For example, the digital form input system modifies each group 542-546 of the drawing input 508 to fit within a corresponding sub-section of the field 112e. Specifically, the digital form input system modifies the first group 542 to fit within the boundary 502a of the first sub-section 502, modifies the second group 544 to fit within the boundary 504a of the second sub-section 504, and modifies the third group 546 to fit within the boundary 506a of the third sub-section 506. The digital form input system provides each of the modified groups for display within each of the corresponding sub-sections 502-506 within the electronic document 106.

It will be appreciated that although FIGS. 5A-5C illustrate the field 112e with a particular arrangement of sub-sections, the digital form input system can operate in conjunction with a variety of fields with a variety of different sub-sections. For example, rather than a field for a social security number, the digital form input system can select a field with sub-sections corresponding to a date (e.g., MM/DD/YYYY); telephone numbers (e.g., (123) 456-7890, sub-sections with three digits for an area code, three digits for the first portion of a local number, and four digits for the last portion of a local number); or other information.

For instance, as discussed above, in one or more embodiments, the digital form input system operates in conjunction with one or more comb fields. As used herein, the term "comb field" refers to a field with sub-sections for individual characters. For example, a comb field for entry of a social security number can have sub-sections for each number in the social security number. Similarly, a comb field for entry of a zip code can include sub-sections for each character in the zip code.

Figure 5E:
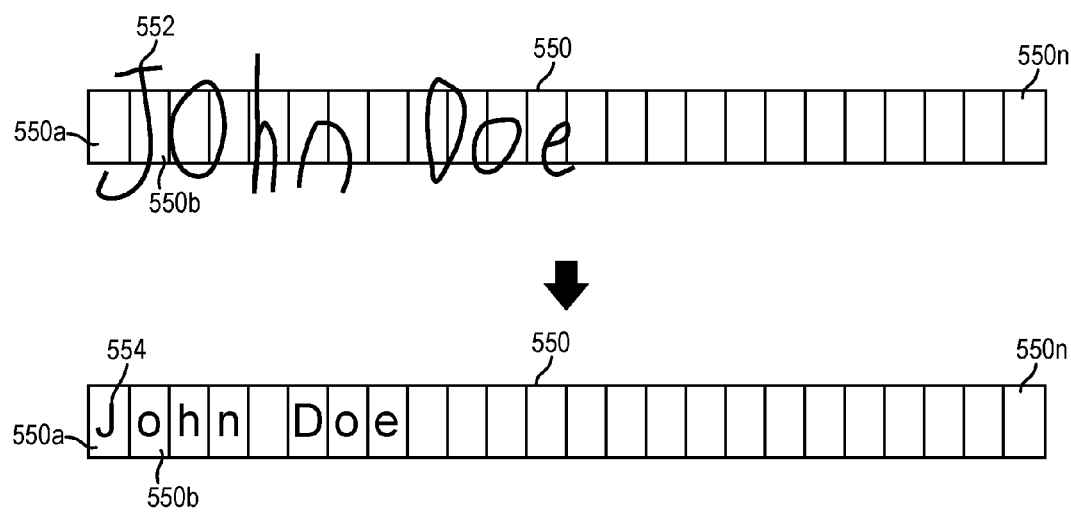

The digital form input system can identify individual characters corresponding to sub-sections of a comb field. For example, FIG. 5E illustrates a comb field 550 having sub-sections 550a-550n together with drawing input 552. As shown, the digital form input system generates a modified drawing input 552, assigns each of the characters of the drawing input 552 to individual fields of the comb field 550, and presents the modified drawing input 552 within sub-fields of the comb filed 550.

More specifically, in relation to the embodiment of FIG. 5E, the digital form input system determines that the drawing input 552 corresponds to the comb field 550 (e.g., based on a number of drawing units falling within the field 550 or based on an amount of overlap between an input region and the field 550). The digital form input system then identifies individual characters corresponding to the drawing input 552. In particular, the digital form input system can apply an optical character recognition algorithm or clustering algorithm to identify individual characters. The digital form input system can identify a variety of characters, including alpha-numeric characters and/or spaces. For example, in relation to FIG. 5E, the digital form input system can determine the letters "J," "o," "h," and "n" in addition to the "_" (i.e., the space) after the letter "n."

In one or more embodiments, the digital form input system can modify the characters it will recognize and/or insert based on the type of form field. For example, the digital form input system can access field properties and determine that a comb field corresponds to financial accounting information (e.g., information that should not contain a space). In response, the digital form input system can exclude spaces in identifying or inserting characters from drawing input.

Upon identifying individual characters, the digital form input system can assign the individual characters to sub-sections of the comb field 550. For instance, as shown, the digital form input system assigns the letter "J" to the sub-section 550a. Similarly, the digital form input system assigns the remaining individual letters to sub-sections of the comb field 550.

Although FIG. 5E illustrates the modified drawing input 552 in the form of digital text characters, it will be appreciated that the digital form input system can also assign detect and assign individual characters illustrated in the drawing input 552. Specifically, rather than converting the drawing input 552 showing the letter "J," the digital form input system can scale and translate the letter "J" from the drawing input 552 such that it fits within the sub-section 550a.

As mentioned previously, in one or more embodiments, the digital form input system can also receive and provide for display drawing input that is not associated with a field. For example, the digital form input system can receive drawing input and determine that no portion of the drawing input is located within a field. In response, the digital form input system can provide the drawing input for display. In this manner, the digital form input system can allow users to draw, draft notes, or select items on an electronic document while also automatically filling fields in the electronic document with drawing input.

Figure 6:
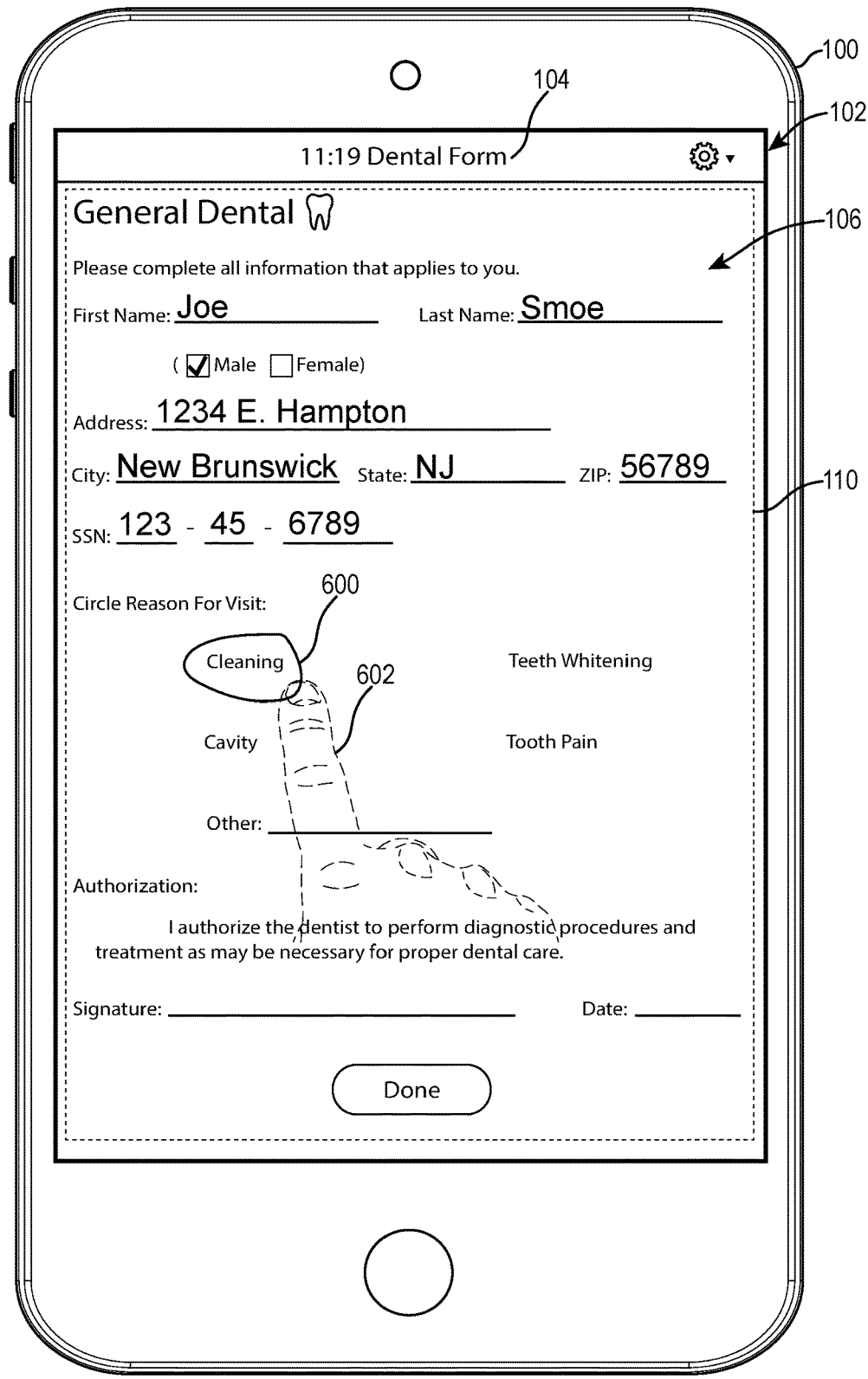
FIG. 6 illustrates receiving drawing input that does not correspond to a field and presenting the drawing input for display in accordance with one or more embodiments.

For example, FIG. 6 illustrates receiving and providing drawing input for display in accordance with one or more embodiments. Specifically, FIG. 6 illustrates a finger 602 interacting with the touchscreen 102 to provide drawing input 600. The interface area 110 receives the drawing input 600. The digital form input system determines that the drawing input 600 is not located within any of the fields 112a-112n. In response, the digital form input system provides the drawing input 600 for display (i.e., without modifying the drawing input 600 to fit within a corresponding field). Accordingly, the digital form input system allows the user in relation to FIG. 6 to indicate a reason for visiting the dentist (i.e., a cleaning) by drawing a circle, while also allowing the user to easily, quickly, and precisely complete the fields 112*a*-112*n*.

As described above, the digital form input system can modify drawing input by converting drawing input to digital text characters and/or by resizing, translating and/or rotating drawing input. In one or more embodiments, the digital form input system can select a particular modification for drawing input based on a field. In particular, the digital form input system can detect a particular type of field and, based on the type of field, select a particular modification.

Figure 7A:
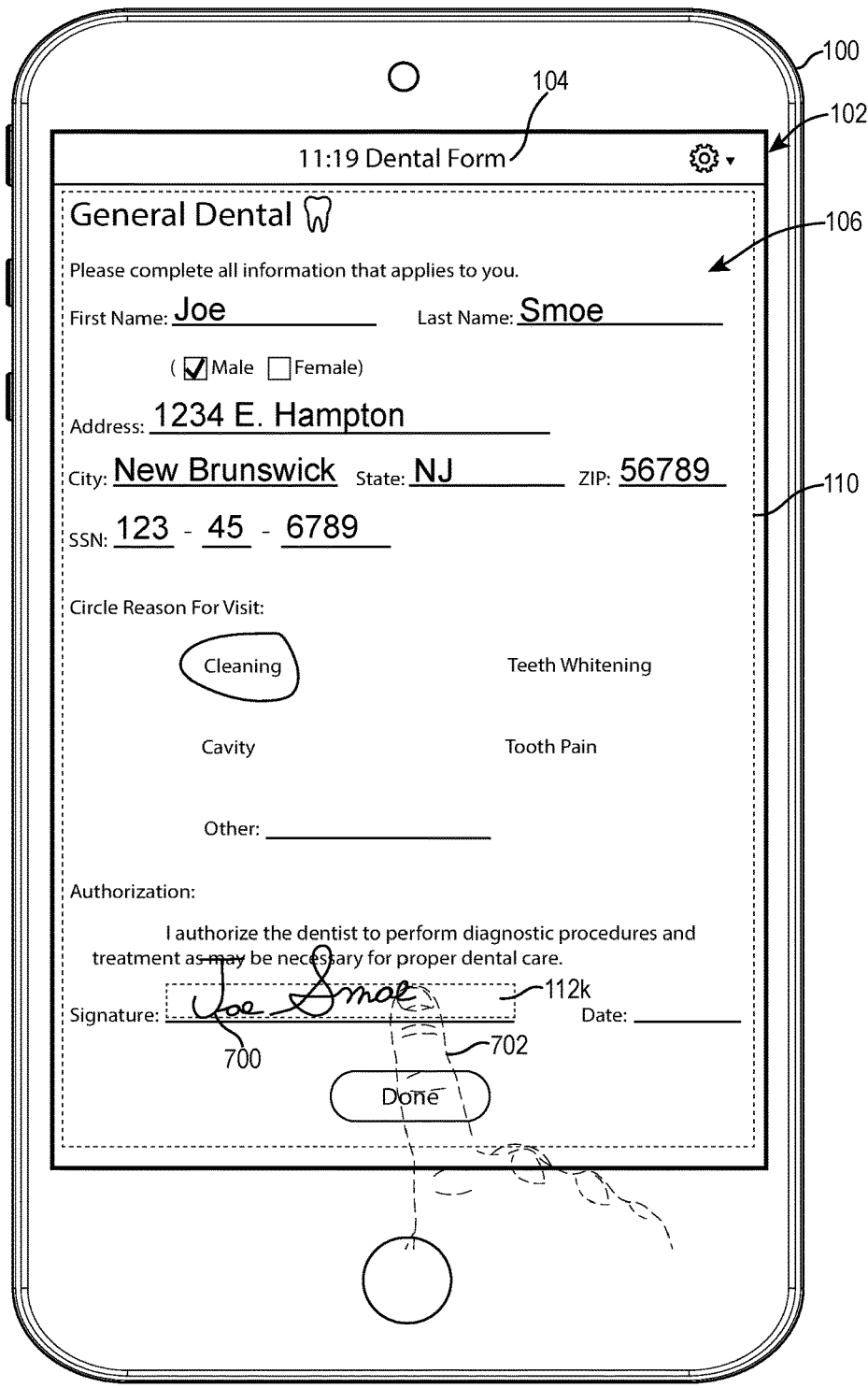
FIGS. 7A-7B illustrate receiving drawing input, determining that the drawing input corresponds to a signature field, and providing the drawing input for display in accordance with one or more embodiments.
Figure 7B:
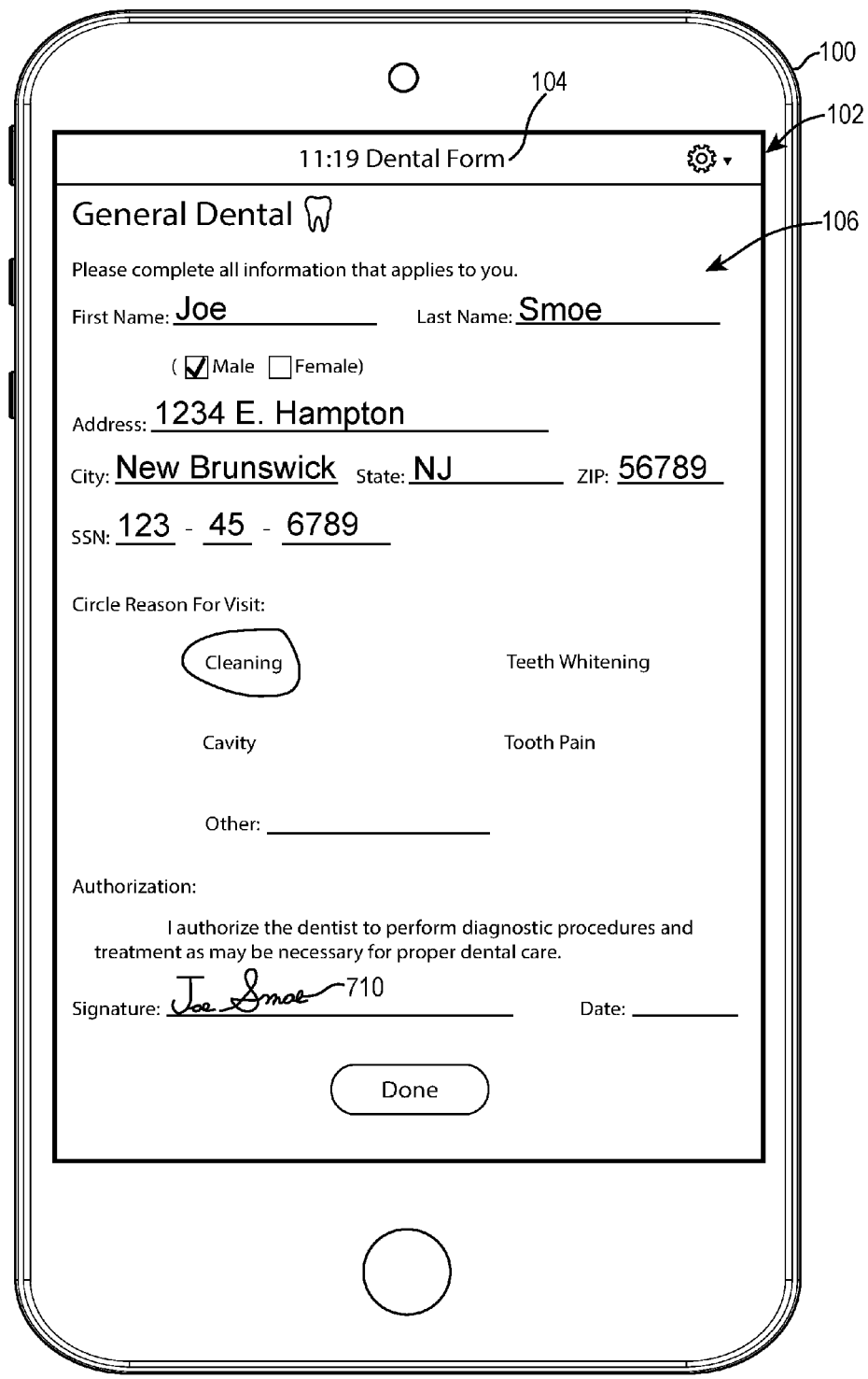

For example, FIGS. 7A-7B illustrate selecting a modification based on a type of field. Specifically, FIG. 7A shows the digital form input system receiving drawing input 700 from a finger 702 in relation to the electronic document 106. The digital form input system determines that the drawing input 700 corresponds to the field 112*k*. Moreover, the digital form input system determines that the field 112*k* is a signature field.

Based on the determination that the field 112*k* is a signature field, the digital form input system can select a modification that preserves the appearance of the signature. Accordingly, as shown in FIG. 7B, the digital form input system elects to resize and translate the drawing input 700 to generate the modified drawing 710 (i.e., rather than converting the drawing input 700 into digital text characters). In this manner, the digital form input system can select a modification based on the type of field.

Although FIGS. 7A-7B illustrate selecting a modification of a signature to preserve the appearance of a signature in relation to a signature field, it will be appreciated that the digital form input system can select a variety of modifications in relation to a variety of types of fields. For example, the digital form input system can detect an address field and (to provide as much clarity as possible) automatically elect to convert drawing input into digital text characters. Similarly, the digital form input system can detect a check box field and automatically elect to convert drawing input into a check mark digital text character.

Figure 8A:
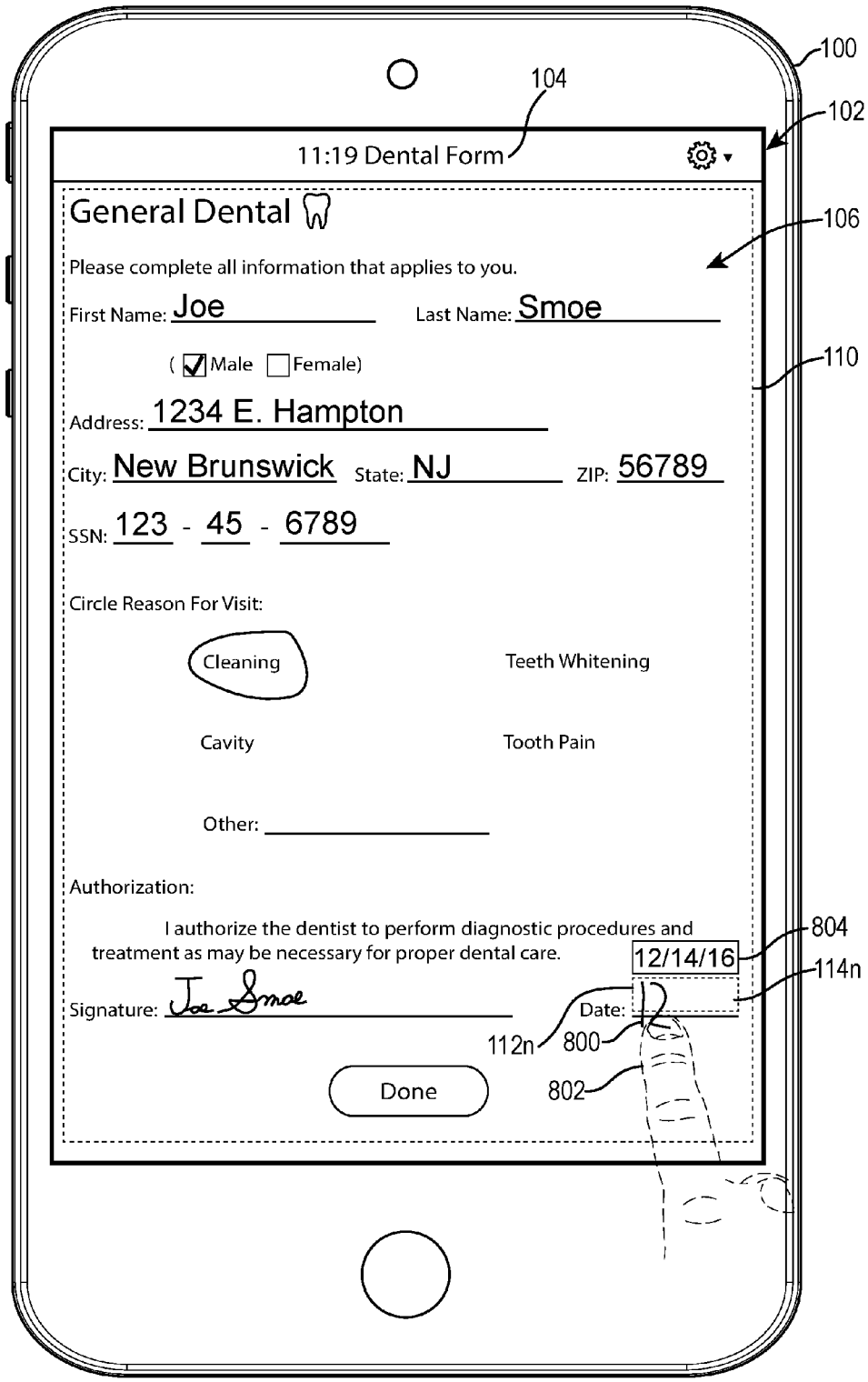
FIGS. 8A-8B illustrate receiving drawing input and providing a selectable auto-complete element in accordance with one or more embodiments.

As mentioned above, the digital form input system can also suggest digital text characters for completing one or more fields. In particular, in one or more embodiments, the digital form input system detects drawing input and provides automatic completion suggestions based on the drawing input. In this manner, the digital form input system can further expedite completion of fields in electronic documents. For example, FIG. 8A illustrates the digital form input system receiving drawing input 800 from a finger 802 interacting with the touchscreen 102. In particular, the drawing input 800 is an incomplete date (i.e., a month "12" without corresponding date or year). The digital form input system detects (utilizing handwriting recognition algorithms) the month and provides a selectable auto-complete element 804 (i.e., suggesting the remainder of the date).

The digital form input system can provide the selectable auto-complete element 804 based on a variety of factors. For example, the digital form input system can provide the selectable auto-complete element 804 based on characteristics of a field. For instance, the digital form input system can determine that the field 112*n* is a date field and, based on that determination, recommend the current date via the selectable auto-complete element. Similarly, the digital form input system can determine that field 112*e* is a city field (e.g., from field properties) and recommend city names based on incomplete drawing input.

In addition, in one or more embodiments, the digital form input system utilizes natural language processing algorithms to identify suggestions. For example, the digital form input system can utilize natural language processing techniques to analyze initial drawing input and predict a word or phrase that a user intends to complete. The digital form input system can provide the predicted word or phrase in the selectable auto-complete element 804.

Figure 8B:
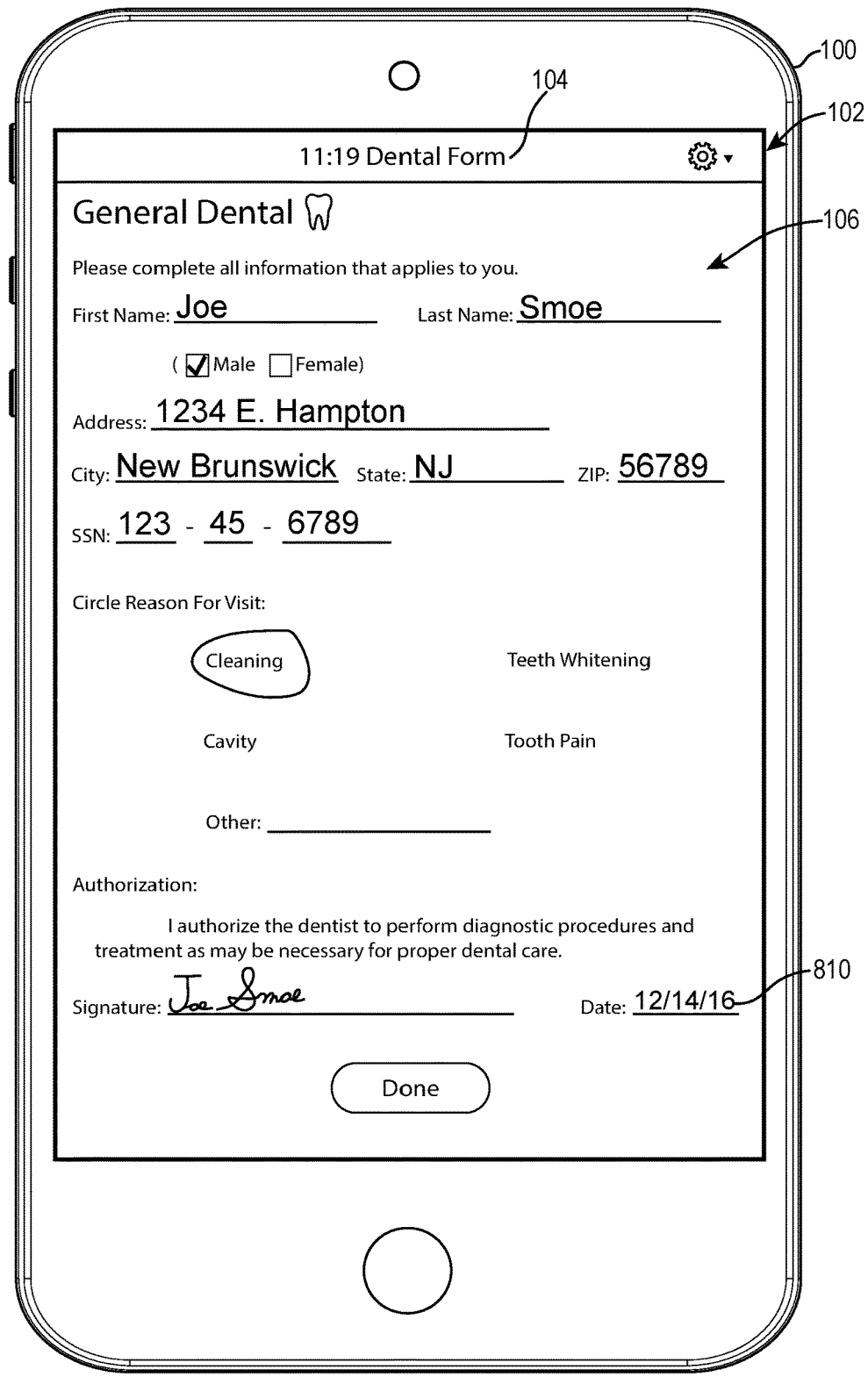

Upon user interaction with the selectable auto-complete element 804, the digital form input system can generate digital content (e.g., digital text characters) and provide the digital content for display in a field. For example, as shown in FIG. 8B, upon user interaction with the selectable auto-complete element, the digital form input system generates digital text characters 810 corresponding to the date and provides the digital text characters 810 for display within the field 112*n*.

Figure 9:
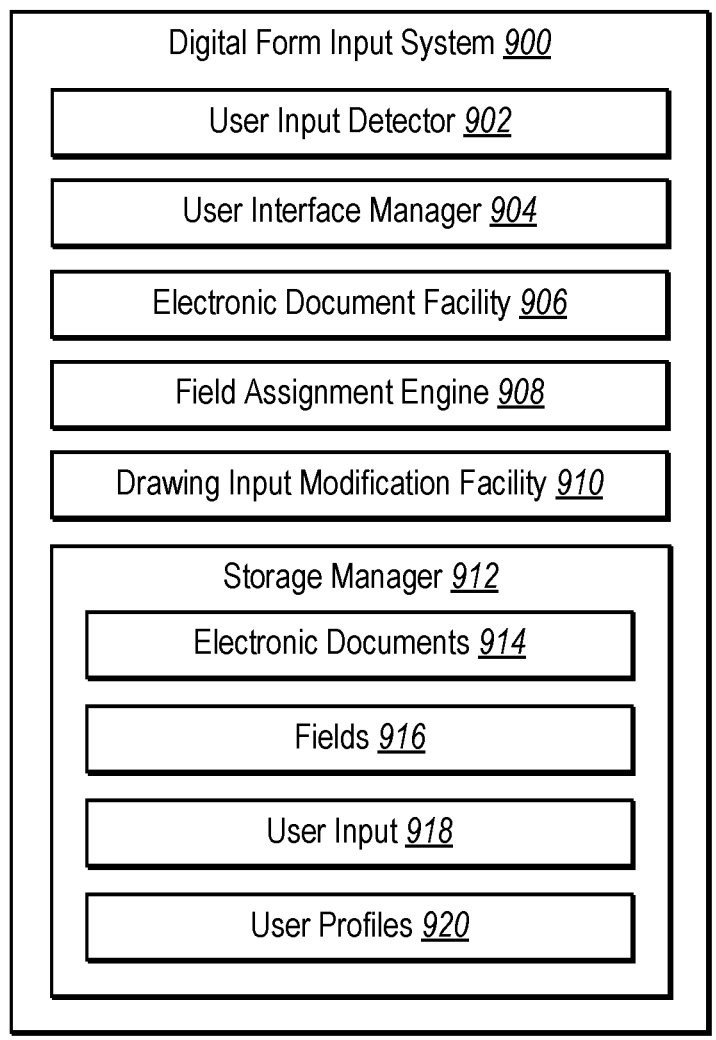
FIG. 9 illustrates a schematic diagram illustrating a digital form input system in accordance with one or more embodiments.

Turning now to FIG. 9, additional detail is provided regarding components and capabilities of one embodiment of the digital form input system. In particular, FIG. 9 illustrates an embodiment of an exemplary digital form input system 900 (e.g., the digital form input system referenced above). As shown, the digital form input system 900 may include, but is not limited to a user input detector 902, a user interface manager 904, an electronic document facility 906, a field assignment engine 908, a drawing input modification facility 910, and a storage manager 912 (comprising electronic documents 914, fields 916, user input 918, and user profiles 920).

As just mentioned, and as illustrated in FIG. 9, the digital form input system 900 may include the user input detector 902. The user input detector 902 can detect, identify, monitor, receive, process, capture, and/or record various types of user input. For example, the user input detector 902 can detect one or more user interactions with respect to a user interface.

The user input detector 902 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 902 detects and identifies various types of user interactions with user input devices, such as press events, drag events, scroll events, release events, and so forth. For example, in the event a client device corresponding to the digital form input system 900 includes a touch screen, the user input detector 902 detects one or more touch gestures (e.g., swipe gestures, tap gestures, pinch gestures, or reverse pinch gestures) from a user that forms a user interaction.

As described above, the user input detector 902 can detect, identify, and/or receive drawing input provided via an input device. More specifically, the user input detector 902 can detect drawing units of drawing input (or other amounts or portions of drawing input) together with locations of the detected drawing units.

As just mentioned, and as illustrated in FIG. 9, the digital form input system 900 also includes the user interface manager 904. The user interface manager 904 provides, manages, and/or controls a graphical user interface (or simply "user interface") for use with the digital form input system 900. In particular, the user interface manager 904 can facilitate presentation of information by way of an external component of a client device (e.g., the computing device 100). For example, the user interface manager 904 can display a user interface by way of a display screen associated with a client device. The user interface may be composed of a plurality of graphical components, objects, and/or elements that allow a user to perform a function (e.g., the interface area 110 described above). The user interface manager 904 presents, via a client device, a variety of types of information, including text, images, video, audio, characters, or other information. Moreover, the user interface manager 904 provides a variety of user interfaces (e.g., the user interface 104) specific to any variety of functions, programs, applications, plug-ins, devices, operating systems, and/or components of a client device. In addition, the user interface manager 904 can provide a variety of elements for display, including the interface area 110, fields, drawing input, digital text characters, modified drawings, and/or the selectable auto-complete element 804.

Moreover, as illustrated in FIG. 9, the digital form input system 900 also includes the electronic document facility 906. The electronic document facility 906 can generate, manage, identify, create, and/or provide one or more electronic documents. In particular, the electronic document facility 906 can identify, create, generate, and/or classify fields within one or more electronic documents. Indeed, as described above, the electronic document facility 906 can generate check box fields, comb fields, or other fields within an electronic document.

In addition to the electronic document facility 906, and as shown in FIG. 9, the digital form input system 900 can also include the field assignment engine 908. The field assignment engine 908 can identify, select, assign, determine, and/or detect one or more fields corresponding to drawing input. In particular, the field assignment engine 908 can assign drawing input to a field based on a location of the drawing input (or a portion of the drawing input) in relation to one or more fields. More specifically, as described above, the field assignment engine 908 can determine a number of drawing units falling within a field boundary and assign drawing input to a field based on the number of drawing units.

As illustrated in FIG. 9, the digital form input system 900 also includes the drawing input modification facility 910. The drawing input modification facility 910 can modify, change, transform, convert, move, resize, translate, rotate, and/or adjust drawing input. For example, as described above, the drawing input modification facility 910 can translate, resize, and/or rotate drawing input to fit within a field of an electronic document. Moreover, as described above, the drawing input modification facility 910 can transform drawing input to generate digital text characters such that the digital text characters fit within a field of an electronic document.

Moreover, as illustrated in FIG. 9, the digital form input system 900 also includes the storage manager 912. The storage manager 912 maintains data to perform the functions of the digital form input system 900. As illustrated, the storage manager 912 includes electronic documents 914, fields 916, user input 918 (e.g., drawing input and/or drawing units), and user profiles 920 (e.g., information regarding one or more users of the digital form input system 900, such as identification information, user history, and/or payment information). The digital form input system can utilize any data stored by the storage manager 912 to identify and/or complete fields in an electronic document.

Each of the components 902-920 of the digital form input system 900 (as shown in FIG. 9) may be in communication with one another using any suitable communication technologies. It will be recognized that although components 902-920 of the digital form input system 900 are shown to be separate in FIG. 9, any of components 902-920 may be combined into fewer components, such as into a single facility or module, divided into more components, or configured into different components as may serve a particular embodiment.

The components 902-920 of the digital form input system 900 can comprise software, hardware, or both. For example, the components 902-920 can comprise one or more instructions stored on a computer-readable storage medium and executable by processors of one or more computing devices. When executed by the one or more processors, the computer-executable instructions of the digital form input system 900 can cause a client device and/or a server device to perform the methods described herein. Alternatively, the components 902-920 and their corresponding elements can comprise hardware, such as a special purpose processing device to perform a certain function or group of functions. Additionally, the components 902-920 can comprise a combination of computer-executable instructions and hardware.

Furthermore, the components 902-920 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-920 may be implemented as a stand-alone application, such as a desktop or mobile application. Furthermore, the components 902-920 may be implemented as one or more web-based applications hosted on a remote server. The components 902-920 may also be implemented in a suite of mobile device applications or "apps." To illustrate, the components 902-920 may be implemented in an application, including but not limited to ADOBE ACROBAT, ADOBE FILL & SIGN, or ADOBE SIGN. "ADOBE," "ACROBAT," "FILL & SIGN," and "ADOBE SIGN," are either registered trademarks or trademarks of Adobe Systems Incorporated in the United States and/or other countries.

Figure 10:
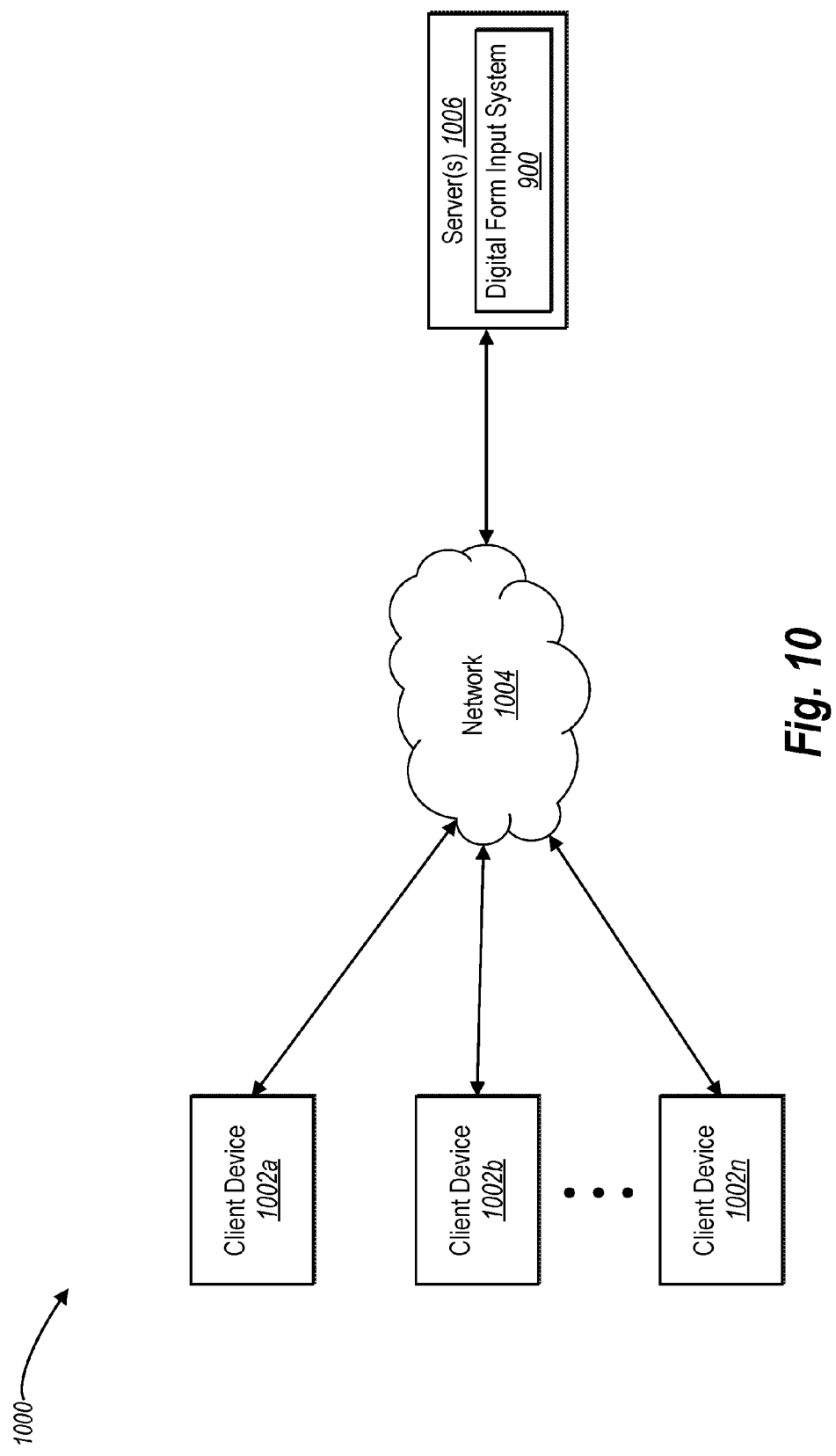
FIG. 10 illustrates a schematic diagram illustrating an exemplary environment in which the digital form input system may be implemented in accordance with one or more embodiments.

FIG. 10 illustrates a schematic diagram of one embodiment of an exemplary environment 1000 in which the digital form input system 900 can operate. In one or more embodiments, the exemplary environment 1000 includes one or more client devices 1002*a*, 1002*b*, . . . 1002*n*, a network 1004, and server(s) 1006. The network 1004 may be any suitable network over which the computing devices can communicate. Example networks are discussed in more detail below with regard to FIG. 14.

As illustrated in FIG. 10, the environment 1000 may include client devices 1002*a*-1002*n*. The client devices 1002*a*-1002*n* may comprise any computing device (e.g., the computing device 100). For instance, in one or more embodiments, one or more of the client devices 1002*a*-1002*n* comprise one or more computing devices described below in relation to FIG. 14.

In addition, the environment 1000 may also include the server(s) 1006. The server(s) 1006 may generate, store, receive, and transmit any type of data, including electronic documents 914, fields 916, user input 918, and/or user profiles 920. For example, the server(s) 1006 may transmit data to a client device, such as the client device 1002*a*. The server(s) 1006 can also transmit electronic messages between one or more users of the environment 1000. In one example embodiment, the server(s) 1006 comprise a content server. The server(s) 1006 can also comprise a communication server or a web-hosting server. Additional details regarding the server(s) 1006 will be discussed below with respect to FIG. 14.

As illustrated, in one or more embodiments, the server(s) 1006 can include all, or a portion of, the digital form input system 900. In particular, the digital form input system 900 can comprise an application running on the server(s) 1006 or a portion of a software application that can be downloaded from the server(s) 1006. For example, the digital form input system 900 can include a web hosting application that allows the client devices 1002a-1002n to interact with content hosted at the server(s) 1006. To illustrate, in one or more embodiments of the exemplary environment 1000, one or more client devices 1002a-1002n can access a webpage supported by the server(s) 1006. In particular, the client device 1002a can run an application to allow a user to access, view, and/or interact with a webpage or website hosted at the server(s) 1006.

Although FIG. 10 illustrates a particular arrangement of the client devices 1002a-1002n, the network 1004, and the server(s) 1006, various additional arrangements are possible. For example, while FIG. 10 illustrates multiple separate client devices 1002a-1002n communicating with the server(s) 1006 via the network 1004, in one or more embodiments a single client device may communicate directly with the server(s) 1006, bypassing the network 1004.

Similarly, although the environment 1000 of FIG. 10 is depicted as having various components, the environment 1000 may have additional or alternative components. For example, the digital form input system 900 can be implemented on a single computing device. In particular, the digital form input system 900 may be implemented in whole by the client device 1002a or the digital form input system 900 may be implemented in whole by the server(s) 1006. Alternatively, the digital form input system 900 may be implemented across multiple devices or components (e.g., utilizing the client devices 1002a-1002n and the server(s) 1006).

By way of example, in one or more embodiments, the client device 1002a sends a request to the server(s) 1006 to access an electronic document. The server(s) 1006 provide (e.g., via the electronic document facility 906) the electronic document to the client device 1002a together with a plurality of fields corresponding to the electronic document. A user interacts with the client device 1002a and the client device 1002a receives drawing input (e.g., via the user input detector 902 and user interface manager 904) in relation to the electronic document and the plurality of fields. The client device 1002a identifies a field corresponding to the received drawing input (e.g., via the field assignment engine 908). Moreover, the client device 1002a modifies the drawing input (e.g., via the drawing input modification facility 910) by converting the drawing input to digital text characters and modifying the digital text characters to fit within the field corresponding to the drawing input. The client device 1002a provides (e.g., via the user interface manager 904) the modified drawing input for display to the user. Moreover, the client device 1002a sends the modified drawing input to the server(s) 1006 for storage with the electronic document and the field (e.g., via the storage manager 912).

Furthermore, the client devices 1002b, 1002n can also provide drawing input to the server(s) 1006 in relation to the electronic document. For example, the client device 1002a can provide drawing input in relation to a first plurality of fields (e.g., information regarding a first user) and the client device 1002b can provide drawing input in relation to a second plurality of fields (e.g., information regarding a second user). The server(s) 1006 can receive and store the drawing input in relation to the electronic document from the client devices 1002a-1002n.

Figure 11:
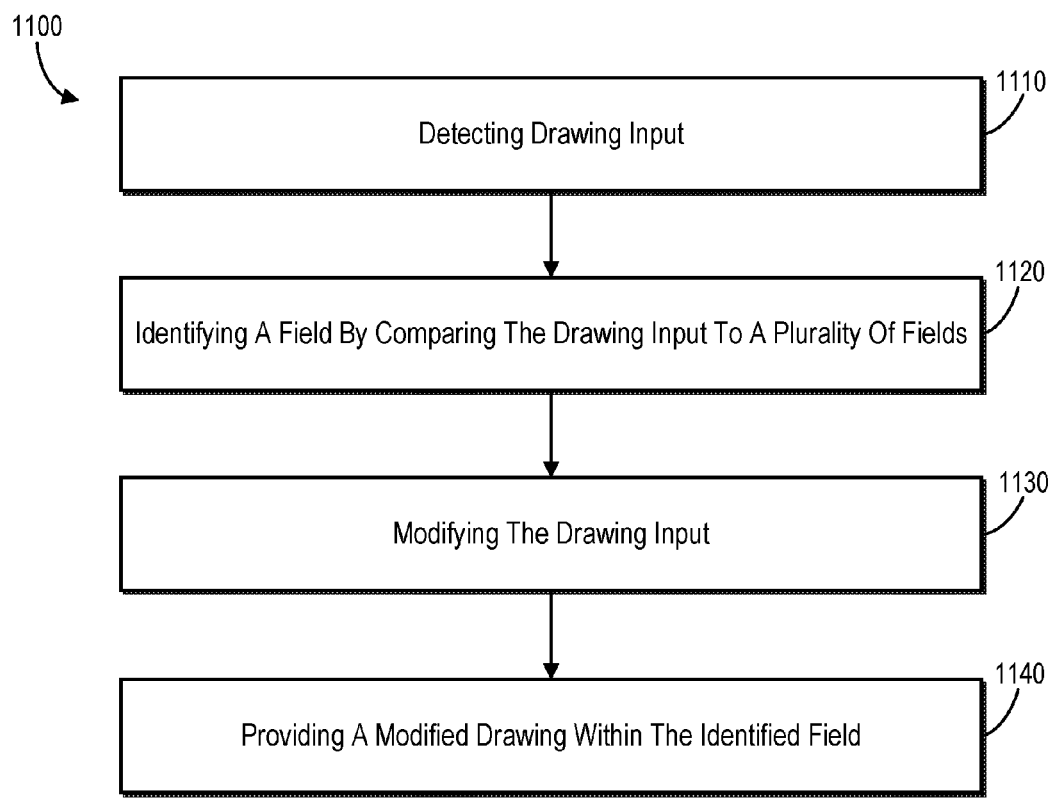
FIG. 11 illustrates a flowchart of a series of acts in a method of completing fields in electronic documents utilizing drawing input in accordance with one or more embodiments.
Figure 12:
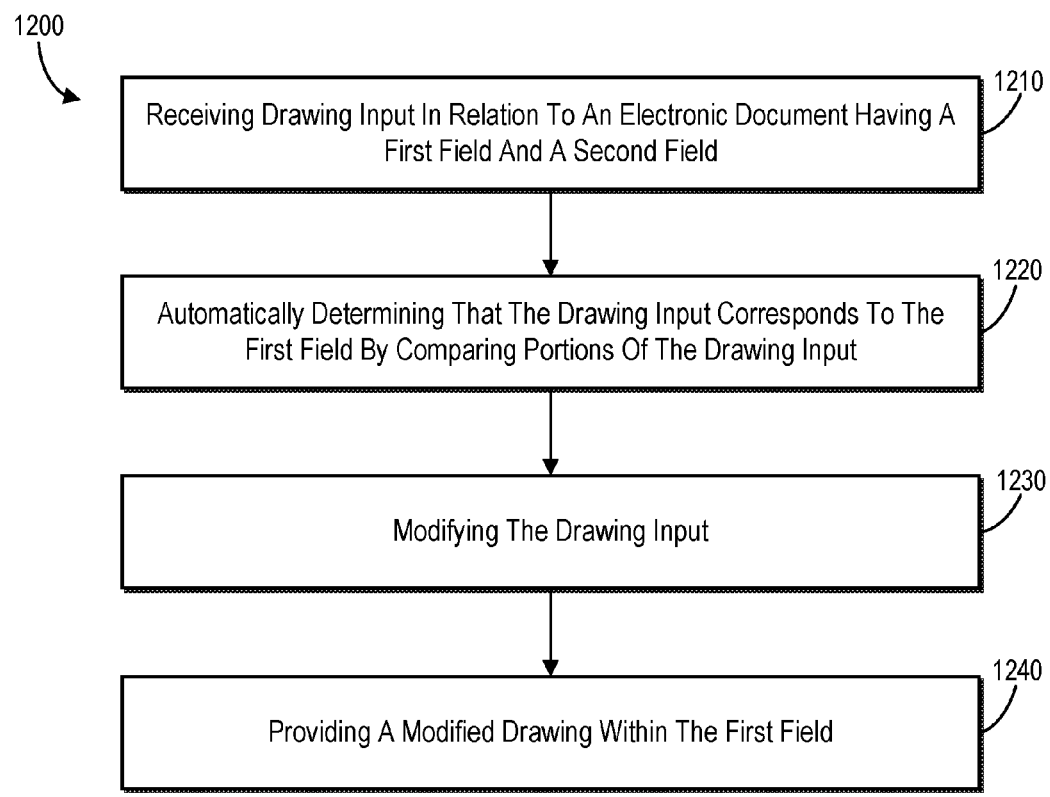
FIG. 12 illustrates a flowchart of a series of acts in a method of completing fields in electronic documents utilizing drawing input in accordance with one or more embodiments.
Figure 13:
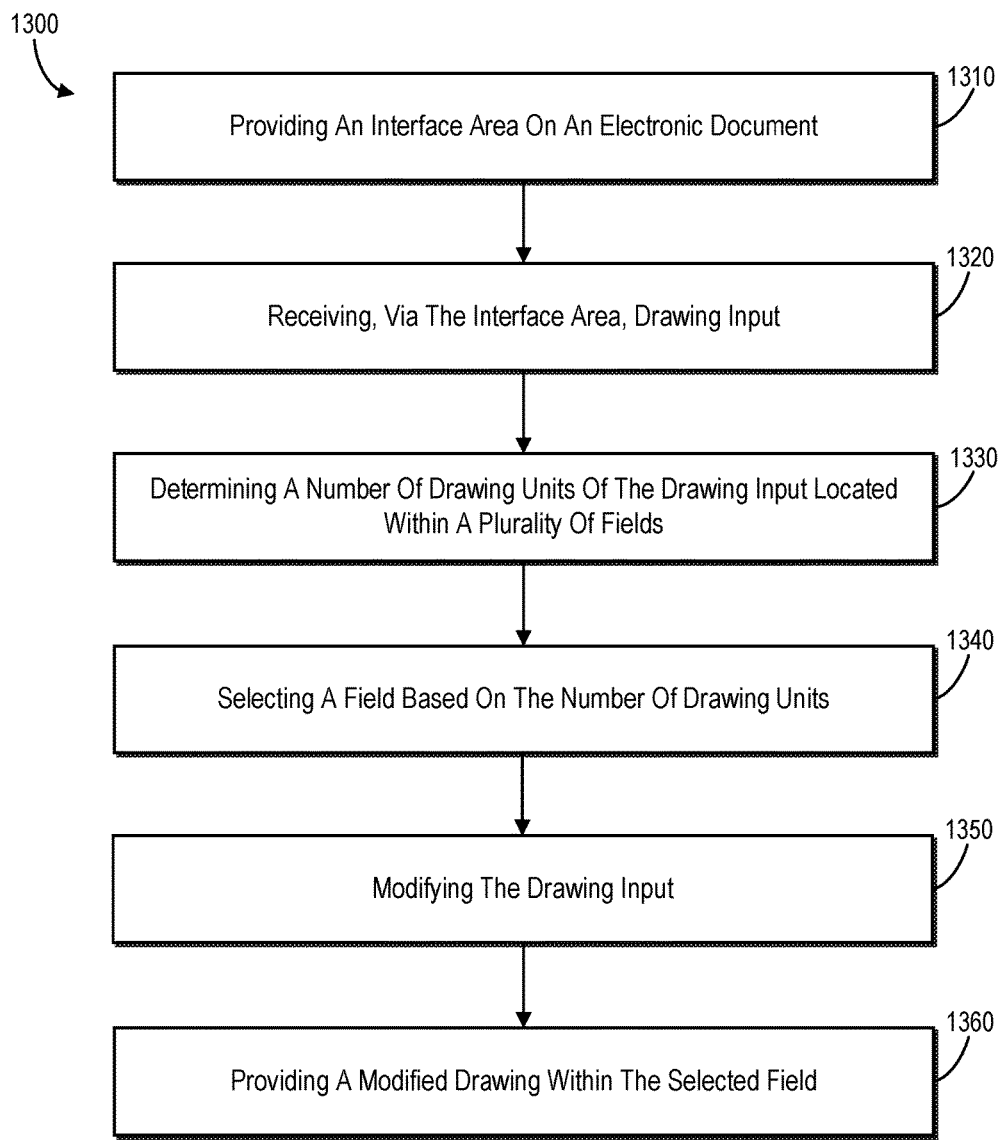
FIG. 13 illustrates a flowchart of a series of acts in a method of completing fields in electronic documents utilizing drawing input in accordance with one or more embodiments.

FIGS. 1A-10, the corresponding text, and the examples, provide a number of different systems and devices for completing fields in electronic documents utilizing drawing input. In addition to the foregoing, embodiments can also be described in terms of flowcharts comprising acts and steps in a method for accomplishing a particular result. For example, FIGS. 11-13 illustrate flowcharts of exemplary methods in accordance with one or more embodiments. The methods described in relation to FIGS. 11-13 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method 1100 of completing fields in an electronic document utilizing drawing input. In one or more embodiments, the method 1100 is performed in a digital medium environment that includes the digital form input system 900. The method 1100 is intended to be illustrative of one or more methods in accordance with the present disclosure, and is not intended to limit potential embodiments. Alternative embodiments can include additional, fewer, or different steps than those articulated in FIG. 11.

As illustrated in FIG. 11, the method 1100 includes an act 1110 of detecting drawing input. In particular, the act 1110 can include detecting drawing input in relation to an electronic document comprising a plurality of fields, wherein each field of the plurality of fields comprises a boundary. For example, in one or more embodiments, the act 1110 comprises receiving drawing input via an interface area on the electronic document.

As shown in FIG. 11, the method 1100 can also include an act 1120 of identifying a field by comparing the drawing input to a plurality of fields. In particular, the act 1120 can include identifying, by at least one processor, a field from the plurality of fields by comparing a location of the drawing input to the boundary of each field of the plurality of fields. For example, in one or more embodiments, the act 1120 comprises identifying an amount of the drawing input within the boundary of each field of the plurality of fields. In particular, the act 1120 can include comparing coordinates of the drawing input to coordinates of the plurality of fields. Moreover, the act 1120 can also include determining that the greatest amount of the drawing input falls within the boundary of the field.

Furthermore, in one or more embodiments, the act 1120 includes identifying an initial portion of the drawing input within a first boundary and a subsequent portion of the drawing input within a second boundary; applying a weight to the initial portion of the drawing input; and comparing the weighted initial portion of the drawing input to the subsequent portion of the drawing input.

In addition, as shown in FIG. 11, the method 1100 can also include an act 1130 of modifying the drawing input. In particular, the act 1130 can include modifying, by the at least one processor, the drawing input to generate a modified drawing. For example, in one or more embodiments, the act 1130 comprises converting the drawing input to digital text characters utilizing a handwriting recognition algorithm.

Further, as illustrated in FIG. 11, the method 1100 can also include an act 1140 of providing a modified drawing within the identified field. In particular, the act 1140 can include providing the modified drawing within a boundary corresponding to the identified field. For example, the act 1140 can include providing the digital text characters within the boundary of the field.

For instance, in one or more embodiments, the field comprises a field with a plurality of sub-sections. The act 1140 can comprise grouping the digital text characters based on the sub-sections; and providing the grouped digital text characters in the plurality of sub-sections.

In addition, the method 1100 can also include providing an interface area encompassing more than one of the plurality of fields; receiving the drawing input via the interface area; and providing at least a portion of the drawing input for display via the interface area while receiving the drawing input. Moreover, the method 110 can also include detecting that the drawing input is complete by determining an expiration of a time period within which no drawing input is received.

FIG. 12 illustrates a flowchart of a series of acts in a method 1200 of completing fields in electronic documents utilizing drawing input in accordance with one or more embodiments of the present invention. The method 1200 includes an act 1210 of receiving drawing input in relation to an electronic document having a first field and a second field. In particular, the act 1210 can include receiving drawing input in relation to an electronic document comprising a first field with a first boundary and a second field with a second boundary, wherein a first portion of the drawing input is located within the first boundary and a second portion of the drawing input is located within the second boundary. For example, in one or more embodiments, the act 1210 comprises determining that the first portion of the drawing input is received prior to the second portion of the drawing input.

As shown in FIG. 12, the method 1200 also includes an act 1220 of automatically determining that the drawing input corresponds to the first field by comparing portions of the drawing input. In particular, the act 1220 can include automatically determining that the drawing input corresponds to the first field by comparing the first portion of the drawing input to the second portion of the drawing input. For example, in one or more embodiments, the act 1220 comprises determining that the first portion of the drawing input within the first boundary is greater than the second portion of the drawing input within the second boundary.

Moreover, in one or more embodiments, the act 1220 comprises based on the determination that the first portion is received prior to the second portion, applying a weight to the first portion of the drawing input; and comparing the weighted first portion of the drawing input to the second portion of the drawing input. Moreover, in one or more embodiments, the act 1220 further includes determining that the first field falls within a vertical threshold distance of the second field; and applying the weight to the first portion based on the determination that the first portion is received prior to the second portion and based on the determination that the first field falls within the vertical threshold distance of the second field.

Moreover, as shown in FIG. 12, the method 1200 also includes an act 1230 of modifying the drawing input. In particular, the act 1230 can include modifying the drawing input to generate a modified drawing based on the boundary of the first field. For example, in one or more embodiments, the act 1230 includes resizing the drawing input to fit within an area defined by the boundary of the first field; and translating the drawing input to a position within the boundary of the first field. Moreover, in one or more embodiments, the act 1230 includes converting the drawing input to digital text characters utilizing a handwriting recognition algorithm.

In addition, as illustrated in FIG. 12, the method 1200 also includes an act 1240 of providing a modified drawing within the first field. In particular, the act 1240 can include providing the modified drawing in the electronic document within the boundary of the first field. For example, in one or more embodiments, the first field comprises a field with a plurality of sub-sections. The act 1240 can include grouping the digital text characters based on the sub-sections; and providing the grouped digital text characters in the plurality of sub-sections.

FIG. 13 illustrates a flowchart of a series of acts in a method 1300 of completing fields in electronic documents utilizing drawing input in accordance with one or more embodiments of the present invention. The method 1300 includes an act 1310 of providing an interface area on an electronic document. In particular, the act 1310 can include providing an interface area on an electronic document, wherein the electronic document comprises a plurality of fields, and each field of the plurality of fields comprises a boundary.

In addition, as shown in FIG. 13, the method 1300 can also include an act 1320 of receiving, via the interface area, drawing input. In particular, the act 1320 can include receiving, via the interface area, drawing input comprising a plurality of drawing units.

Moreover, as shown in FIG. 13, the method 1300 can also include an act 1330 of determining a number of drawing units of the drawing input located within a plurality of fields. In particular, the act 1330 can include determining a number of drawing units of the drawing input located within the boundary corresponding to each field of the plurality of fields.

Further, as illustrated in FIG. 13, the method 1300 can also include an act 1340 of selecting a field based on the number of drawing units. In particular, the act 1340 can include selecting a field of the plurality of fields based on the number of drawings units located within a boundary corresponding to the selected field. For example, in one or more embodiments, the act 1340 can comprise identifying the field of the plurality of fields with the greatest number of drawing units.

Moreover, in one or more embodiments, the act 1340 comprises identifying an initial set of drawing units falling within a first boundary and a subsequent set of drawing units falling within a second boundary; applying a weight to the initial set of drawing units corresponding to the first boundary; and comparing the weighted initial set of drawing units corresponding to the first boundary to the subsequent set of drawing units corresponding to the second boundary.

As illustrated in FIG. 13, the method 1300 can also include an act 1350 of modifying the drawing input. In particular, the act 1350 can include modifying the drawing input based on the boundary corresponding to the selected field. For example, in one or more embodiments, the act 1350 comprises converting the drawing input to digital text characters utilizing an optical character recognition algorithm; and modifying the digital text characters to fit within the boundary of the field.

As shown in FIG. 13, the method 1300 can also include an act 1360 of providing a modified drawing within the selected field. In particular, the act 1360 can include providing the modified drawing in the electronic document within the boundary corresponding to the selected field. For example, in one or more embodiments, the act 1360 comprises providing the digital text characters within the boundary of the field.

In one or more embodiments, the method 1300 also includes providing the drawing input for display via the interface area while receiving the drawing input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
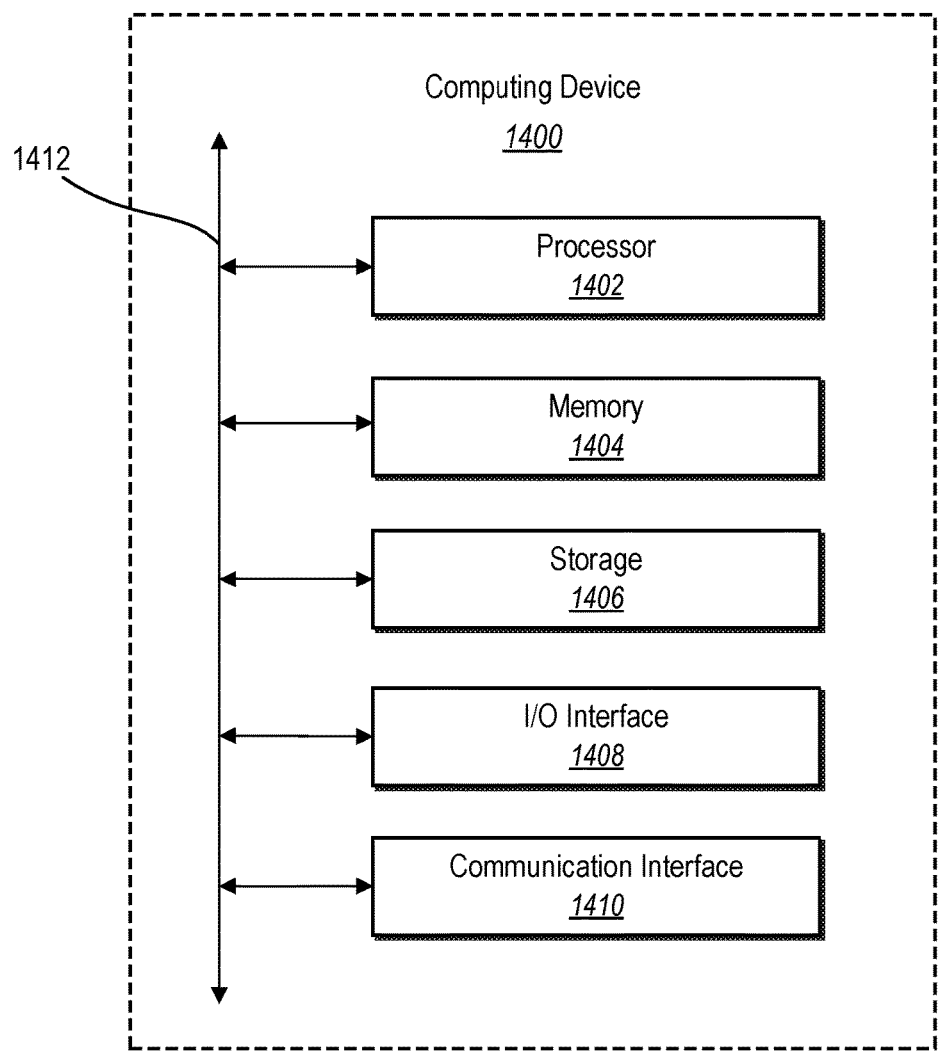
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that the digital form input system 900 can comprise implementations of the computing device 1400. As shown by FIG. 14, the computing device can comprise a processor 1402, memory 1404, a storage device 1406, an I/O interface 1408, and a communication interface 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a stylus or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment, a method of quickly and efficiently completing form fields in electronic documents by automatically assigning scribble input, comprising:
    detecting drawing input within a first field having a first boundary and a second field having a second boundary of an electronic document;
    comparing, by at least one processor, a location of the drawing input to the first boundary of the first field and the second boundary of the second field to determine a first amount of drawing input within the first field and a second amount of drawing input within the second field;
    weighting the first amount of drawing input based on one or more characteristics of the drawing input;
    based on a determination that the weighted first amount of drawing input exceeds the second amount of drawing input, selecting the first field for providing the drawing input for display;
    modifying, by the at least one processor, the drawing input to generate a modified drawing; and
    providing the modified drawing within the first boundary of the first field.

2. The method of claim 1, further comprising weighting the second amount of drawing input based on the one or more characteristics of the drawing input.

3. The method of claim 2, wherein selecting the first field for providing the drawing input for display comprises:
    comparing the weighted first amount of drawing input and the weighted second amount of drawing input; and
    determining that the weighted first amount of drawing input exceeds the weighted second amount of drawing input.

4. The method of claim 1, wherein weighting the first amount of drawing input based on the one or more characteristics of the drawing input comprises weighting the first amount of drawing input based on a starting position of the drawing input.

5. The method of claim 1, wherein weighting the first amount of drawing input based on the one or more characteristics of the drawing input comprises weighting the first amount of drawing input based on a position of the first field relative to the second field.

6. The method of claim 1, further comprising:
    providing an interface area encompassing the first field and the second field;
    receiving the drawing input via the interface area; and
    providing at least a portion of the drawing input for display via the interface area while receiving the drawing input.

7. The method of claim 1, wherein:
    modifying the drawing input comprises converting the drawing input to digital text characters utilizing a handwriting recognition algorithm; and providing the modified drawing within the first boundary of the first field comprises providing the digital text characters within the first boundary of the first field.

8. The method of claim 7, wherein:
the first field comprises a plurality of sub-sections; and
providing the modified drawing within the first boundary corresponding to the first field comprises:
grouping the digital text characters based on the plurality of sub-sections; and
providing the grouped digital text characters in the plurality of sub-sections.

9. A system for completing form fields in electronic documents from scribble input, comprising:
at least one processor;
at least one non-transitory computer readable storage medium storing instructions thereon, that, when executed by the at least one processor, cause the system to:
receive drawing input in relation to an electronic document comprising a first field with a first boundary and a second field with a second boundary, wherein a first portion of the drawing input is located within the first boundary and a second portion of the drawing input is located within the second boundary;
weight the first portion of the drawing input and the second portion of the drawing input based on one or more characteristics of the drawing input;
automatically determine that the drawing input corresponds to the first field based on a determination that the weighted first portion of the drawing input exceeds the weighted second portion of the drawing input;
modify the drawing input to generate a modified drawing based on the first boundary of the first field; and
provide the modified drawing in the electronic document within the first boundary of the first field.

10. The system of claim 9, further comprising instructions that, when executed by the at least one processor, cause the system to weight the first portion of the drawing input based on a starting position of the drawing input.

11. The system of claim 9, further comprising instructions that, when executed by the at least one processor, cause the system to weight the first portion of the drawing input and the second portion of the drawing input based on the one or more characteristics of the drawing input by:
determining that the first portion of the drawing input is received prior to the second portion of the drawing input; and
based on the determination that the first portion is received prior to the second portion, weighting the first portion of the drawing input with respect to the second portion of the drawing input.

12. The system of claim 9, further comprising instructions, that when executed by the at least one processor, cause the system to weight the first portion of the drawing input and the second portion of the drawing input based on the one or more characteristics of the drawing input by:
determining that the first field falls within a vertical threshold distance of the second field; and
weighting the first portion of the drawing input and the second portion of the drawing input based on the determination that the first field falls within the vertical threshold distance of the second field.

13. The system of claim 9, wherein modifying the drawing input comprises:
resizing the drawing input to fit within an area defined by the first boundary of the first field; and
translating the drawing input to a position within the first boundary of the first field.

14. The system of claim 9, further comprising instructions that, when executed by the at least one processor, cause the system to weight the first portion of the drawing input and the second portion of the drawing input based on the one or more characteristics of the drawing input by:
identifying a first normalized portion of the drawing input from the first portion of the drawing input based on a first ratio of the first portion of the drawing input and an area of the first field; and
identifying a second normalized portion of the drawing input from the second portion of the drawing input based on a second ratio of the second portion of the drawing input and an area of the second field; and
weighting the first normalized portion of the drawing input and the second normalized portion of the drawing input.

15. The system of claim 9, wherein:
the first field comprises a plurality of sub-sections; and
providing the modified drawing within the first boundary of the first field comprises:
identifying characters of the drawing input; and
providing the characters of the drawing input in the plurality of sub-sections.

16. A non-transitory computer readable medium storing instructions thereon that, when executed by at least one processor, cause a computer system to:
provide an interface area on an electronic document, wherein the electronic document comprises a first field having a first boundary and a second field having a second boundary;
receive, via the interface area, drawing input comprising a plurality of drawing units;
determine a first number of drawing units of the drawing input located within the first boundary of the first field and a second number of drawing units of the drawing input located within the second boundary of the second field;
weight the first number of drawing units based on one or more characteristics of the drawing input;
select the first field based on a determination that the weighted first number of drawing units exceeds the second number of drawing units;
modify the drawing input based on a boundary corresponding to the first field; and
provide the modified drawing input in the electronic document within the boundary corresponding to the first field.

17. The non-transitory computer readable medium of claim 16, further comprising instructions that, when executed by the at least one processor, cause the computer system to weight the second number of drawing units based on one or more characteristics of the drawing input.

18. The non-transitory computer readable medium of claim 17, wherein selecting the first field comprises:
comparing the weighted first number of drawing units and the weighted second number of drawing units; and
determining that the weighted first number of drawing units exceeds the weighted second number of drawing units.

19. The non-transitory computer readable medium of claim 16, further comprising instructions that, when executed by the at least one processor, cause the computer system to weight the first number of drawing units based on the one or more characteristics of the drawing input by:

identifying a first normalized number of drawing units of the first field based on a ratio of drawing units corresponding to the first field and an area of the first field; and selecting the first field based on the first normalized number of drawing units.

20. The non-transitory computer readable medium of claim 16, further comprising instructions that, when executed by the at least one processor, cause the computer system to weight the first number of drawing units based on the one or more characteristics of the drawing input by:

identifying pre-existing digital content within the first field; and weighting the first number of drawing units based on the identified pre-existing digital content within the first field.

\* \* \* \* \*